(12) United States Patent
Hara

(10) Patent No.: US 11,875,829 B2
(45) Date of Patent: Jan. 16, 2024

(54) MAGNETIC DISK DEVICE AND REORDERING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takeyori Hara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 273 days.

(21) Appl. No.: 17/408,185

(22) Filed: Aug. 20, 2021

(65) Prior Publication Data

US 2022/0293130 A1    Sep. 15, 2022

(30) Foreign Application Priority Data

Mar. 10, 2021  (JP) .................................. 2021-038243

(51) Int. Cl.
  *G11B 5/55*      (2006.01)
  *G06F 3/06*      (2006.01)

(52) U.S. Cl.
  CPC ............ *G11B 5/556* (2013.01); *G06F 3/0604* (2013.01); *G06F 3/0659* (2013.01); *G06F 3/0676* (2013.01)

(58) Field of Classification Search
  None
  See application file for complete search history.

(56) References Cited

U.S. PATENT DOCUMENTS

| | | | | |
|---|---|---|---|---|
| 5,991,825 A * | 11/1999 | Ng | ......................... | G06F 3/0674 |
| | | | | 710/39 |
| 6,418,510 B1 * | 7/2002 | Lamberts | .............. | G06F 3/0656 |
| | | | | 711/E12.07 |
| 6,426,843 B1 * | 7/2002 | Lamberts | ............... | G11B 21/02 |
| | | | | 360/75 |
| 6,553,454 B1 * | 4/2003 | Harada | ................. | G06F 3/0601 |
| | | | | 711/111 |
| 9,471,221 B2 * | 10/2016 | Haines | .................. | G06F 3/0659 |
| 10,049,691 B1 | 8/2018 | Gaertner et al. | | |

(Continued)

FOREIGN PATENT DOCUMENTS

JP    2007-328912 A    12/2007
JP    2021-77434 A    5/2021

*Primary Examiner* — Fred Tzeng
(74) *Attorney, Agent, or Firm* — Allen & Overy LLP

(57) ABSTRACT

According to one embodiment, a magnetic disk device includes a first head which writes and reads to the first disk, a second head which writes data and reads data to the second disk, a first actuator including the first head, a second actuator including the second head, and a controller which performs a first reordering process for a command scored in a first queue corresponding to the first actuator and performs a second reordering process for a command stored in a second queue corresponding to the second actuator, wherein the controller selects a first command to be executed next by the first actuator based on current and future operating states of the second actuator, and executes the first command.

20 Claims, 9 Drawing Sheets

(56) References Cited

U.S. PATENT DOCUMENTS

| | | | |
|---|---|---|---|
| 2001/0028524 A1* | 10/2001 | Hoskins | G06F 3/0611 360/55 |
| 2002/0091882 A1* | 7/2002 | Espeseth | G06F 3/0676 711/158 |
| 2003/0084261 A1* | 5/2003 | Byrd | G06F 3/0689 711/167 |
| 2003/0149834 A1* | 8/2003 | Susnjar | G11B 25/043 |
| 2003/0220896 A1* | 11/2003 | Gaertner | G06F 3/0601 |
| 2004/0015653 A1* | 1/2004 | Trantham | G06F 3/0676 711/112 |
| 2005/0071547 A1 | 3/2005 | Lin | |
| 2005/0166014 A1* | 7/2005 | Kobayashi | G06F 3/0611 711/112 |
| 2007/0253096 A1 | 11/2007 | Alfred et al. | |
| 2008/0005458 A1* | 1/2008 | Lawson | G06F 13/28 711/112 |
| 2010/0011168 A1* | 1/2010 | Ryu | G06F 12/0804 711/135 |
| 2010/0077175 A1* | 3/2010 | Wu | G06F 3/0659 711/E12.001 |
| 2010/0153664 A1* | 6/2010 | Yoshida | G06F 3/0611 711/E12.001 |
| 2021/0096764 A1* | 4/2021 | Calfee | G06F 3/0604 |
| 2021/0141566 A1 | 5/2021 | Sudo | |

* cited by examiner

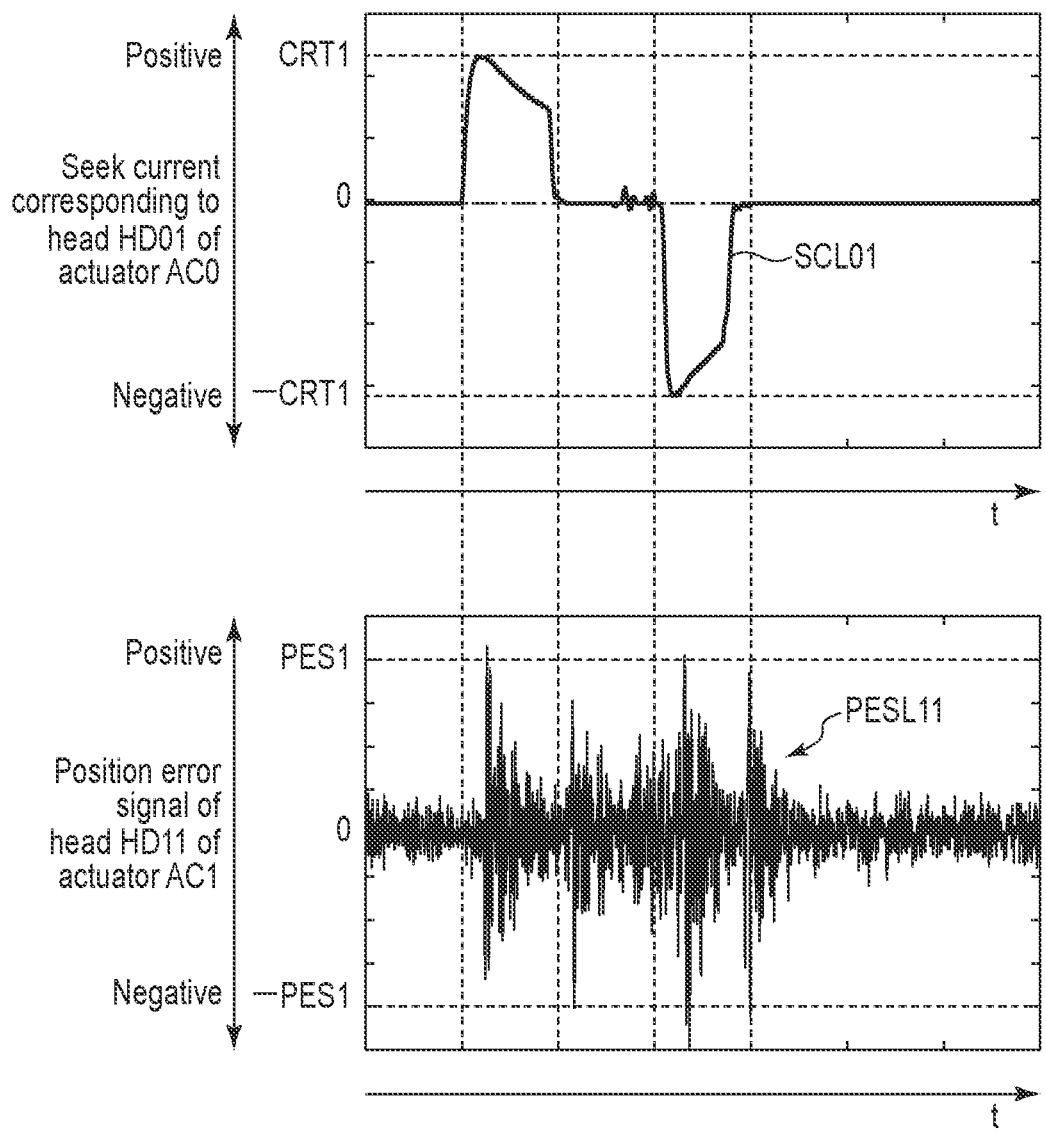
F I G. 7

MAGNETIC DISK DEVICE AND REORDERING METHOD

CROSS-REFERENCE TO RELATED APPLICATIONS

This application is based upon and claims the benefit of priority from Japanese Patent Application No. 2021-038243, filed Mar. 10, 2021, the entire contents of which are incorporated herein by reference.

FIELD

Embodiments described herein relate generally to a magnetic disk device and a reordering method.

BACKGROUND

A magnetic disk device performs a reordering process of storing a plurality of commands transferred from a host or the like in a queue and rearranging the order in which the commands stored in the queue are processed. A split actuator magnetic disk device including a plurality of actuators has recently been proposed. In the split actuator magnetic disk device, the actuators are controlled independently. The split actuator magnetic disk device stores a plurality of commands corresponding to each of the actuators in a queue corresponding to each of the actuators, and reorders the commands stored in the queue corresponding to each of the actuators.

BRIEF DESCRIPTION OF THE DRAWINGS

FIG. 7 is a schematic diagram showing an example of the change in a seek current corresponding to the head of an actuator according to the embodiment and the change in a position error signal of the head of another actuator.

SUMMARY OF THE INVENTION

In general, according to one embodiment, a magnetic disk device comprises: a first disk; a second disk; a first head which writes data to the first disk and reads data from the first disk; a second head which writes data to the second disk and reads data from the second disk; a first actuator including the first head; a second actuator including the second head; and a controller which performs a first reordering process for a command stored in a first queue corresponding to the first actuator and performs a second reordering process for a command stored in a second queue corresponding to the second actuator, wherein the controller selects a first command to be executed next by the first actuator based on current and future operating states of the second actuator, and executes the first command.

DETAILED DESCRIPTION

An embodiment will be described below with reference to the drawings. The drawings are only one example and do not limit the scope of the invention.

Embodiment

Figure 1:
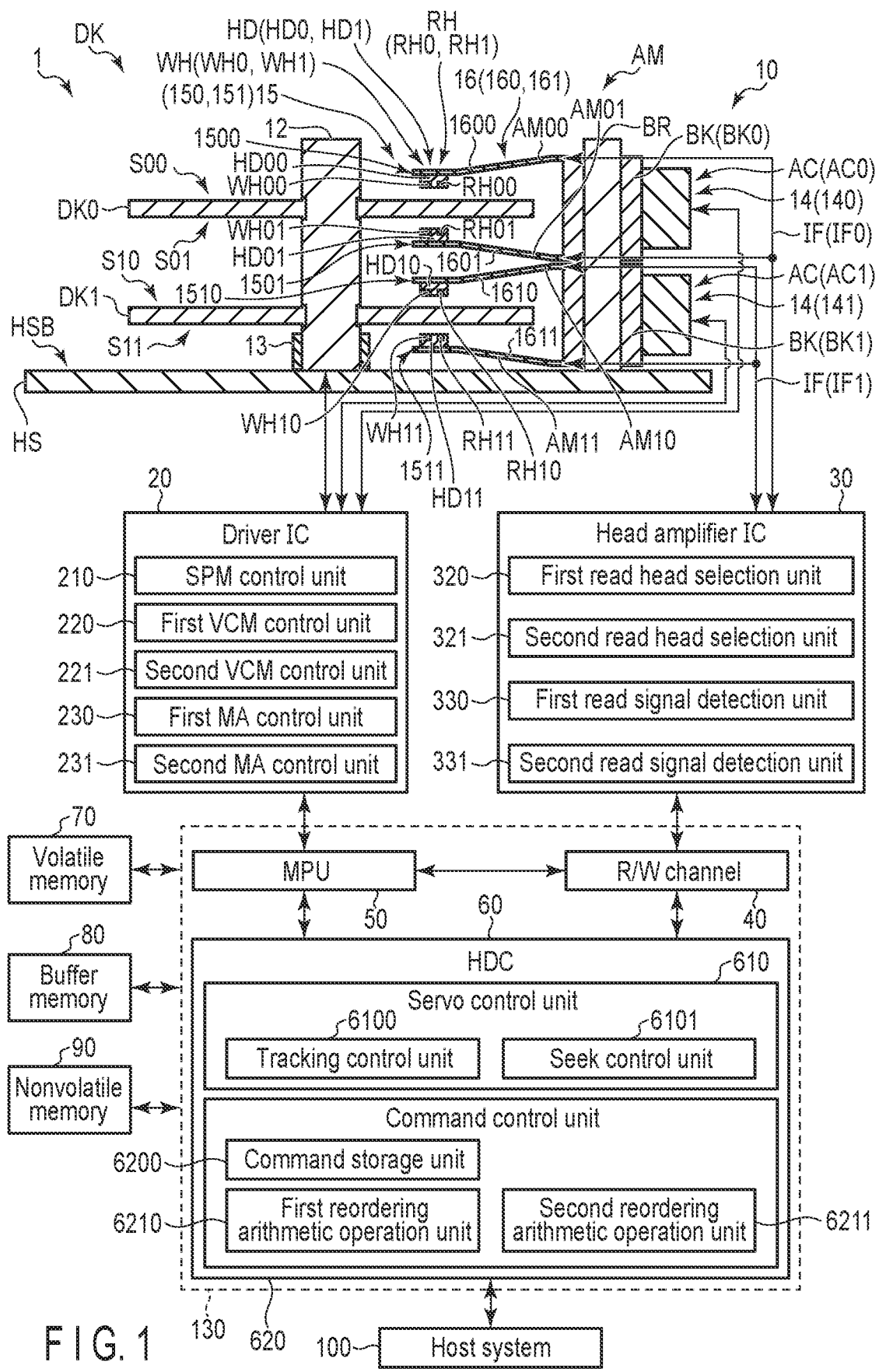
FIG. 1 is a schematic diagram showing an example of a configuration of a magnetic disk device according to an embodiment.

FIG. 1 is a schematic diagram showing an example of a configuration of a magnetic disk device 1 according to an embodiment.

The magnetic disk device 1 includes a housing HS, a head disk assembly (HDA) 10, a driver IC 20, a head amplifier integrated circuit (referred to as a head amplifier IC or a preamplifier hereinafter) 30, a volatile memory 70, a buffer memory (buffer) 80, a nonvolatile memory 90, and a system controller 130 that is a one-chip integrated circuit. The magnetic disk device 1 is connected to a host system (referred to simply as a host hereinafter) 100. The magnetic disk device 1 is a split actuator magnetic disk device capable of independently driving a plurality of actuators AC to be described later. The magnetic disk device 1 includes a plurality of actuators AC, for example, two actuators (actuators AC0 and AC1 to be described later). Note that the magnetic disk device 1 may include three or more actuators AC. The magnetic disk device 1 is capable of driving the actuators AC in parallel and reading and writing data in parallel by the head on each of the actuators.

The housing HS has a bottom wall HSB. FIG. 1 shows as if the housing HS had only the bottom wall HSB, but, in practice, the housing HS has not only the bottom wall HSB but also sidewalls standing along the periphery of the bottom wall HSB, and a cover that blocks an opening in a base formed by the bottom wall HSB and the sidewalls.

The HDA 10 includes a magnetic disk (referred to as a disk hereinafter) DK, a head HD, a spindle motor (referred to as an SPM hereinafter) 13 that rotates a spindle 12, an arm AM, an actuator block BK, a voice coil motor (referred to as a VCM hereinafter) 14, a suspension 15, and a microactuator (referred to as an MA hereinafter) 16. Note that the HDA 10 need not include the MA 16. If the HDA 10 does not include the MA 16, the head HD may be mounted on the arm AM. FIG. 1 shows a section of the HDA 10.

The SPM 13 is attached to the bottom wall HSB. The spindle 12 is attached to a central part of the SPM 13.

The disk DK includes a plurality of disks DK. The disk DK is attached to the spindle 12 and rotated by driving the SPM 13. The disk DR has a front surface (or a top surface) and a back surface (or a bottom surface) opposed to the front surface (or the top surface). Hereinafter, the front surface (or the top surface; and/or the back surface or the bottom surface) may also be simply referred to as a disk. In the example shown in FIG. 1, the disk DK includes disks DK0 and DK1. The disks DK0 and DK1 are attached to the spindle 12. The disk DK0 is placed above the disk DK1, for example. In other words, the disk DK1 is placed, for example, between the disk DK0 and the bottom wall HSB. The disk DK0 has a top surface S00 and a bottom surface S01 opposed to the top surface S00. The disk DK1 has a top surface S00 and a bottom surface S01 opposed to the top surface S00. Note that the disk DK may include three or more disks. Hereinafter, a direction along the circumference of the disk DK (the top and bottom surfaces of the disk DK) will be referred to as a circumferential direction, and a direction orthogonal to the circumferential direction of the disk DK (the top and bottom surfaces of the disk DK) will be referred to as a radial direction. The radial direction corresponds to a direction toward the inner circumferential side and the outer circumferential side on the disc DK (the top and bottom surfaces of the disk DK).

The head HD includes a plurality of heads HD. The head HD faces the disk DK. The head HD includes a write head WH for writing data to the disk DK and a read head RH for reading data from the disk DK. Hereinafter, "a process of writing data to the disk DK" may be referred to as "a write process" and "a process of reading data from the disk DK" may be referred to as "a read process". In addition, "recording data in a particular recording area", "reading data from a particular recording area", "placing the head HD in a particular position of the disk DK", "writing data to a particular area of the disk DK", "reading data from a particular area of the disk DK", "communicatively connecting to a particular area" and the like may be referred to as "accessing".

In the example shown in FIG. 1, the head HD includes heads HD0 and HD1. The head HD0 includes, for example, a head HD00 facing the top surface S00 of the disk DK0 and a head HD01 facing the bottom surface S01 of the disk DK0. Note that the head HD0 may include only one head or three or more heads. The head HD0 includes a write head WH0 for writing data to the disk DK0 and a read head RH0 for reading data written to the disk DK0. The write head WH0 includes a write head WH00 and a write head WH01. The read head RH0 includes a read head RH00 and a read head RH01.

The head HD00 includes a write head WH00 for writing data to the top surface S00 of the disk DK0 and a read head RH00 for reading data from the top surface S00 of the disk DK0. The head HD01 includes a write head WH01 for writing data to the bottom surface S01 of the disk DK0 and a read head RH01 for reading data from the bottom surface S01 of the disk DK0.

The head HD1 includes, for example, a head HD10 facing the top surface S10 of the disk DK1 and a head HD11 facing the bottom surface S11 of the disk DK1. Note that the head HD1 may include only one head or three or more heads. The head HD1 includes a write head WH1 for writing data to the disk DK1 and a read head RH1 for reading data from the disk DK1. The write head WH1 includes a write head WH10 and a write head WH11. The read head RH1 includes a read head RH10 and a read head RH11.

The head HD10 includes a write head WH10 for writing data to the top surface S10 of the disk DK1 and a read head RH10 for reading data from the top surface S10 of the disk DK1. The head HD1 includes a write head WH11 for writing data to the bottom surface S11 of the disk DK1 and a read head RH11 for reading data from the bottom surface S11 of the disk DK1.

The actuator block BK includes a plurality of actuator blocks BK. The actuator block BK is rotatably attached to a bearing BR standing on the bottom wall HSB. In the example shown in FIG. 1, the actuator block BK includes actuator blocks BK0 and BK1. The actuator blocks BK0 and BK1 are rotatably attached to the bearing BR standing on the bottom wall HSB. The actuator block BK0 is placed on the actuator block BK1. In other words, the actuator block BK1 is located between the bottom wall HSB and the actuator block BK0.

The arm AM includes a plurality of arms AM. The arm AM is connected to the actuator block BK. In the example shown in FIG. 1, the arm AM includes arms AM0 and AM1. The arm AM0 is placed above the arm AM1. In other words, the arm AM1 is placed between the arm AM0 and the bottom wall HSB of the housing HS. The arm AM may include only one arm or three or more arms depending on the number of actuators AC.

The arm AM0 includes, for example, an arm AM00 located alongside the top surface S00 of the disk DK0 and an arm AM01 located alongside the bottom surface S01 of the disk DK0. Note that the arm AM0 may include only one arm or three or more arms depending on the number of heads HD0. The arm AM0 is connected to the actuator block BK0.

The arm AM1 includes, for example, an arm AM10 located alongside the top surface S10 of the disk DK1 and an arm AM11 located alongside the bottom surface S11 of the disk DK1. Note that the arm AM1 may include only one arm or three or more arms depending on the number of heads 101. The arm AM1 is connected to the actuator block BK1.

The VCM 14 includes a plurality of VCMs 14. The VCM 14 is connected to the actuator block BK on the opposite side of the arm AM. In the example shown in FIG. 1, the VCM 14 includes VCMs 140 and 141. The VCM 140 is connected to the actuator block BK0 on the opposite side of the arm AM0. The VCM 141 is connected to the actuator block BK1 on the opposite side of the arm AM1. The VCM 14 may include only one VCM or may have three or more VCMs depending on the number of actuator blocks BK.

The suspension 15 includes a plurality of suspensions 15. The suspension 15 is attached to the arm AM. The distal end portion of the suspension 15, which is opposed to the other end portion of the suspension 15 connected to the arm AM, is provided with the head HD. In the example shown in FIG. 1, the suspension 15 includes a suspension 150 and a suspension 151. The suspension 150 is placed above the suspension 151. In other words, the suspension 151 is placed between the suspension 150 and the bottom wall HSB of the housing HS. The suspension 15 may include only one suspension or three or more suspensions depending on the number of arms AM.

The suspension 150 is attached to the arm AM0. The distal end portion of the suspension 150, which is opposed to the other end portion of the suspension 150 connected to the arm AM0, is provided with the head HD0. The suspension 150 includes, for example, a suspension 1500 attached to the arm AM00 and a suspension 1501 attached to the arm AM01. The distal end portion of the suspension 1500, which is opposed to the other end portion of the suspension 1500 connected to the arm AM00, is provided with the head HD00. The distal end portion of the suspension 1501, which is opposed to the other end portion of the suspension 1501 connected to the arm AM01, is provided with the head HD01. Note that the suspension 150 may include only one suspension or may have three or more suspensions depending on the number of arms AM0.

The suspension 151 is attached to the arm AM1. The distal end portion of the suspension 151, which is opposed to the other end portion of the suspension 151 connected to the arm AM1, is provided with the head HD1. The suspension 151 includes, for example, a suspension 1510 attached to the arm AM10 and a suspension 1511 attached to the arm AM11. The distal end portion of the suspension 1510, which is opposed to the other end portion of the suspension 1510 connected to the arm AM10, is provided with the head HD10. The distal end portion of the suspension 1511, which is opposed to the other end portion of the suspension 1511 connected to the arm AM11, is provided with the head HD11. The suspension 151 may include only one suspension or may have three or more suspensions depending on the number of arms AM1.

The MA 16 includes a plurality of MAs 16. The MA 16 is attached to the arm AM or the suspension 15 or the head HD. The MA 16 finely controls the operation of the head HD in the radial direction. For example, the MA 16 controls the operation of the head HD in the radial direction more finely than the operation of the head HD in the radial direction by the VCM 14.

In the example shown in FIG. 1, the MA 16 includes an MA 160 and an MA 161. The MA 160 is attached to the suspension 150. The MA 160 finely controls the operation of the head HD0 in the radial direction. For example, the MA 160 controls the operation of the head HD0 in the radial direction more finely than the operation of the head HD0 in the radial direction by the VCM 140. The MA 160 includes, for example, an MA 1600 attached to the suspension 1500 and an MA 1601 attached to the suspension 1501. The MA 1600 finely controls the operation of the head HD00 in the radial direction. For example, the MA 1600 controls the operation of the head HD00 in the radial direction more finely than the operation of the head HD00 in the radial direction by the VCM 140. The MA 1601 finely controls the operation of the head HD01 in the radial direction. For example, the MA 1601 controls the operation of the head HD01 in the radial direction more finely than the operation of the head HD01 in the radial direction by the VCM 140. Note that the MA 160 may include only one MA or may have three or more MAs depending on the number of suspensions 150.

The MA 161 is attached to the suspension 151. The MA 161 finely controls the operation of the head HD1 in the radial direction. For example, the MA 161 controls the operation of the head HD1 in the radial direction more finely than the operation of the head HD1 in the radial direction by the VCM 141. The MA 161 includes, for example, an MA 1610 attached to the suspension 1510 and an MA 1611 attached to the suspension 1511. The MA 1610 finely controls the operation of the head HD10 in the radial direction. For example, the MA 1610 controls the operation of the head HD0 in the radial direction more finely than the operation of the head HD10 in the radial direction by the VCM 141. The MA 1611 finely controls the operation of the head HD11 in the radial direction. For example, the MA 1611 controls the operation of the head HD11 in the radial direction more finely than the operation of the head HD11 in the radial direction by the VCM 141. Note that the MA 161 may include only one MA or may have three or more MAs depending on the number of suspensions 151.

The actuator AC includes a plurality of actuators AC. Each of the actuators AC is turnably (or rotatably) attached to the bearing BR. In other words, the actuators AC turn independently around the bearing BR. Note that the actuators AC may turn in parallel around the bearing BP. Each of the actuators AC includes a suspension 15, an MA 16, an arm AM, an actuator block BK and a VCM 14. Each of the actuators AC drives the VCM 14 around the bearing BR and finely drives the MA 16 to set the head HD mounted on the suspension 15 in a particular position of the disk DK. When each of the actuators AC does not include the MA 16, it drives the VCM 14 around the bearing BR to set the head HD mounted on the suspension 15 in a particular position of the disk DK.

In the example shown in FIG. 1, the actuator AC includes actuators AC0 and AC1. The actuator AC0 is placed on the actuator AC1. In other words, the actuator AC1 is placed between the bottom wall HSB and the actuator AC0. Note that three or more actuators AC may be provided.

The actuator AC0 is rotatably attached to the bearing BR. The actuator AC0 includes a suspension 150, an MA 160, an arm AM0, an actuator block BK0 and a VCM 140. The actuator AC0 drives the VCM 140 around the rotational axis of the bearing BR and finely drives the MA 160 to set the head HD0 mounted on the suspension 150 in a particular position of the disk DK0. When the actuator AC0 does not include the MA 160, it drives the VCM 140 around the bearing BR to set the head HD0 mounted on the suspension 150 in a particular position of the disk DK0.

The actuator AC1 is rotatably attached to the bearing BR. The actuator AC1 includes a suspension 151, an MA 161, an arm AM1, an actuator block BK1 and a VCM 141. The actuator AC1 drives the VCM 141 around the rotational axis of the bearing BR and finely drives the MA 161 to set the head HD1 mounted on the suspension 151 in a particular position of the disk DK1. When the actuator AC1 does not include the MA 161, it drives the VCM 141 around the bearing BR to set the head HD1 mounted on the suspension 151 in a particular position of the disk DK1.

Figure 2:
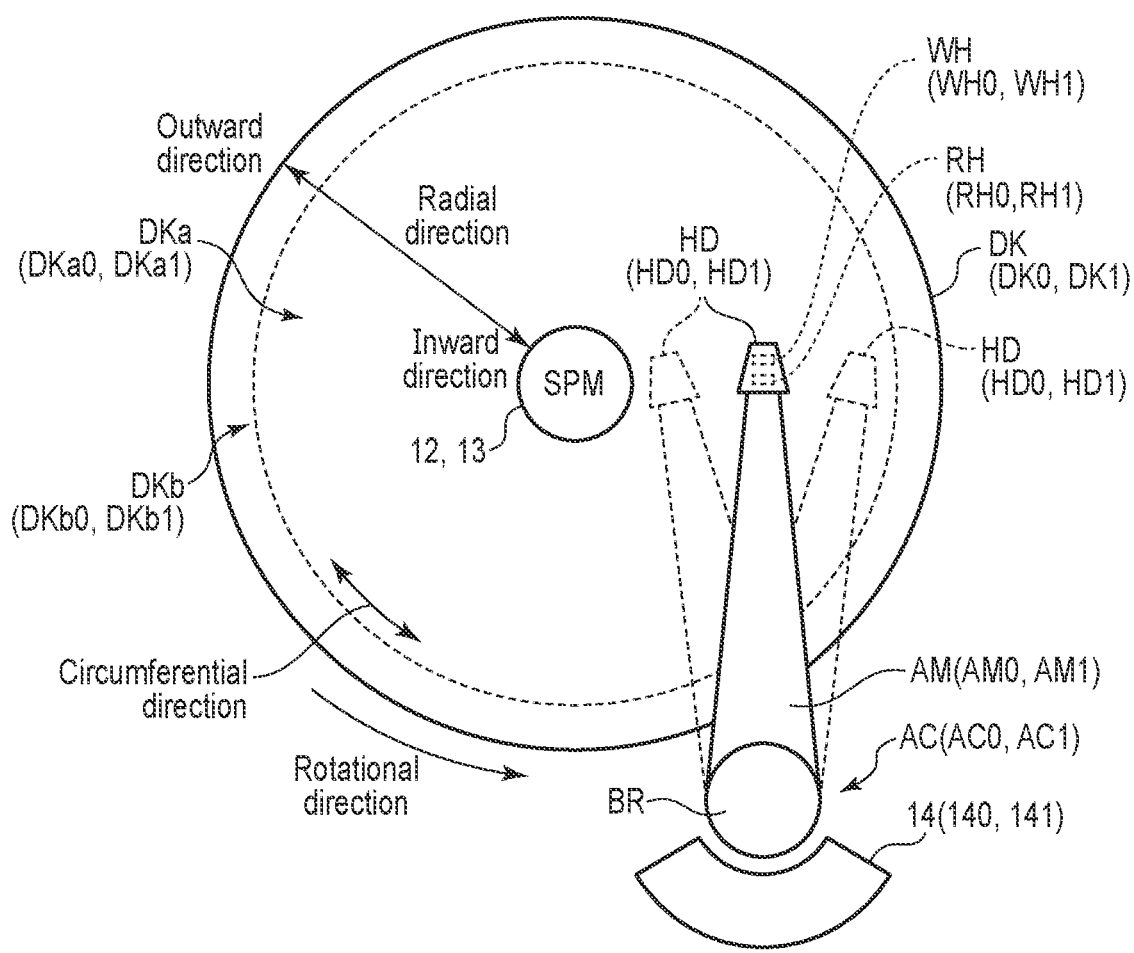
FIG. 2 is a plan view showing an example of the placement of a head relative to a disk.

FIG. 2 is a plan view showing an example of the placement of the head HD relative to the disk DK. As shown in FIG. 2, the direction toward the outer periphery of the disk DK in the radial direction will be referred to as an outward direction (outside), and the direction opposite to the outward direction will be referred to as an inward direction (inside). The direction in which the disk DK rotates in the circumferential direction will be referred to as a rotational direction. The rotational direction is a counterclockwise direction in the example shown in FIG. 2, but may be an opposite direction (clockwise direction).

In the disk DK, a user data area DKa which is available from a user and a system area DKb to which information necessary for system management (also referred to as system information hereinafter) is written, are allocated to an area to which the data of the disk DK can be written. Hereinafter, a particular position of the disk DK in its radial direction may be referred to as a radial position, and a particular position of the disk DK in its circumferential direction may be referred to as a circumferential position. The radial position and the circumferential position may also be referred to simply as a position. For example, the radial position corresponds to the position of a track or a sector (data sector) in the radial direction, and the circumferential position corresponds to the position of a sector in a particular track in the circumferential direction. For example, the position corresponds to the position of a sector (data sector) in the disk DK. The position of a sector (data sector) can be indicated by at least one of a cylinder (track) number including a particular sector, a head number of the head HO accessing a particular sector, a sector number of a particular sector, a radial position of a particular sector in the disk DK, and a disk angle of a particular sector. For example, the position of a sector is indicated by the combination of three of the cylinder (track) number including a particular sector, head number of the head HD accessing a particular sector, sector number of a particular sector, radial position of a particular sector in the disk DK, and disk angle of a particular sector. The disk DK may include at least one track.

Hereinafter, the term "track" will be used in various meanings such as "one of a plurality of areas into which the disk DK is divided in the radial direction", "data written to the circumference of the disk DK", and "a path along the circumference of the disk DK". The track includes a plurality of sectors. The term "sector" will be used in various meanings such as "one of a plurality of areas into which a track is divided in the circumferential direction" and "data written to one of the areas into which a track is divided in the circumferential direction". In the example shown, in FIG. 7, a user data area DKa0 and a system area DKb0 are allocated to the disk DK0. Alternatively, a user data area DKa1 and a system area DKb1 are allocated to the disk DK1.

The disk DK includes a plurality of servo areas (also be referred to as servo patterns or servo data hereinafter), which are not shown. The servo patterns, for example, extend radially in the radial direction of the disk DK and are arranged discretely at particular intervals in the circumferential direction. Servo data including preamble, servo mark, gray code, PAD, burst data, post code and the like is written to the servo pattern. User data is written to the user data area DKa other than the servo patterns.

The head HD slides in the horizontal plane of the disk DK when the actuator AC rotates around the bearing BR during seeking, for example. In the example shown in FIG. 2, the head HD0 slides in the horizontal plane of the disk DK0 when the actuator AC0 rotates around the bearing BR during seeking, for example. In addition, the head HD1 slides in the horizontal plane of the disk DK1 when the actuator AC1 rotates around the bearing BR during seeking, for example.

The driver IC 20 controls the driving of the SPM 13 and VCM 14 (VCMs 140 and 141) under the control of the system controller 130 (specifically, MPU 50 or HDC 60 to be described later. The driver IC 20 is electrically connected to the SPM 13 and VCM 14 (VCMs 140 and 141). The driver IC 20 is connected to, for example, the SPM 13 through a particular interface. The driver IC 20 is connected to, for example, each of the VCMs 140 and 141 through an interface.

The driver IC 20 includes an SPM control unit 210, a first VCM control unit 220, a second VCM control unit 221, a first microactuator (MA) control unit 230 and a second microactuator (MA) control unit 231. The SPM control unit 210 controls the rotation of the SPM 13. The first VCM control unit 220 controls the current (or the voltage) supplied to the VCM 140 to control the driving of the VCM 140. The second VCM control unit 221 controls the current (or the voltage) supplied to the VCM 141 to control the driving of the VCM 141. The first MA control unit 230 controls the current (or the voltage; supplied to the MA 160 to control the drive of the MA 160. The second MA control unit 231 controls the current (or the voltage) supplied to the MA 161 to control the driving of the MA 16. Note that the system controller 130 may include some of the components of the driver IC 20 (e.g., the SPM control unit 210, first VCM control unit 220, second VCM control unit 221, first MA control unit 230 and second MA control unit 231). If the actuator AC0 does not include the MA 160 or the actuator AC1 does not include the MA 161, the first MA control unit 230 and the second MA control unit 231 is unnecessary. In addition, two or more driver ICs 20 may be provided depending on the number of actuators AC.

The head amplifier IC (preamplifier) 30 amplifies a read signal read from the disk DK and outputs the amplified read signal to the system controller 130 (specifically, a read/write (R/W) channel 40 to be described later). The head amplifier IC 30 supplies the head HD with a write current corresponding to the write data output from the system controller 130 (specifically, the R/W channel 40 to be described later). The head amplifier IC 30 is electrically connected to each actuator AC, for example, the actuator AC0 and the actuator AC1. The head IC 30 is connected to each actuator AC through an interface IF. For example, the head IC 30 is connected to the actuator AC1 through an interface IF0 and connected to the actuator AC2 through an interface IF. For example, the head IC 30 transmits/receives a signal to/from the actuator AC1 through the interface IF0, and transmits/receives a signal to/from the actuator AC2 through the interface IF1. The head amplifier IC 30 is electrically connected to each head HD, for example, the head HD0 and the head HD1 through the interface IF. For example, the head amplifier IC 30 is electrically connected to the head HD0 through the interface IF0 and electrically connected to the head HD1 through the interface IF1. The head amplifier IC 30 supplies the head HD with a write current corresponding to a signal output from the R/W channel 40 via the interface IF, and receives a read signal from the head HD via the interface IF. For example, the head amplifier IC 30 supplies the head HD0 with a write current corresponding to a signal output from the R/W channel 40 via the interface IF0, and receives a read signal from the head HD0 via the interface IF0. For example, the head amplifier IC 30 supplies the head HD1 with a write current corresponding to a signal output from the R/W channel 40 via the interface IF1, and receives a read signal from the head HD1 via the interface IF1.

The head amplifier IC 30 includes a first read head selection unit 320, a second read head selection unit 321, a first read signal detection unit 330 and a second read signal detection unit 331. The first read head selection unit 320 selects a read head RH0 that reads data from the disk DK0 in the actuator AC0. The second read head selection unit 321 selects a read head RH1 that reads data from the disk DK1 in the actuator AC1. The first read signal detection unit 330 detects a signal (read signal) read from the disk DK0 by the read head RH0. The second read signal detection unit 331 detects a signal (read signal) read from the disk DK1 by the read head RH1. Note that the system controller 130 may include some of the components of the head amplifier IC 30 (e.g., the first read head selection unit 320, second read head selection unit 321, first read signal detection unit 330 and second read signal detection unit 331). In addition, two or more head amplifier ICs 30 may be provided depending on the number of actuators AC.

The volatile memory 70 is a semiconductor memory from which stored data is lost when power supply is cut off. The volatile memory 70 stores data and the like necessary for processing in each component of the magnetic disk device 1. The volatile memory 70 is, for example, a dynamic random access memory (DRAM) or a synchronous dynamic random access memory (SDRAM).

The buffer memory 50 is a semiconductor memory which temporarily records data and the like transmitted and received between the magnetic disk device 1 and the host 100. Note that the buffer memory 80 may be integrated with the volatile memory 70. The buffer memory 80 is, for example, a DRAM, a static random access memory (SRAM), an SDRAM, a ferroelectric random access memory (FeRAM) or a magnetoresistive random access memory (MRAM).

The nonvolatile memory 90 is a semiconductor memory that records stored data even when power supply is cut off.

The nonvolatile memory 90 is, for example, a NOR type or a NAND type flash read only memory (FROM).

The system controller (controller) 130 is implemented using, for example, a large-scale integrated circuit (LSI) called a system-on-a-chip (SoC) in which a plurality of elements are integrated on a single chip. The system controller 130 includes the read/write (R/W) channel 40, microprocessor (MPU) 50 and hard disk controller (HDC) 60. The system controller 130 is electrically connected to the driver IC 20, head amplifier IC 30, volatile memory 70, buffer memory 80, nonvolatile memory 90 and host system 100. Note that the system controller 130 may include the SPM control unit 210, first VCM control unit 220, second VCM control unit 221, first read head selection unit 320, second read head selection unit 321, first read signal detection unit 330 and second read signal detection unit 331. The system controller 130 may include the driver IC 20 and head amplifier IC 30. In addition, two or more system controllers 130 may be provided depending on the number of actuators AC.

The R/W channel 40 executes signal processing for read data transferred from the disk DK to the host 100 and write data transferred from the host 100 in response to an instruction from the MPU 50 to be described later. The R/W channel 40 has a circuit or a function for measuring the signal quality of read data. The R/W channel 40 is electrically connected to, for example, the head amplifier IC 30, MPU 50 and HDC 60. Note that two or more R/W channels 40 may be provided depending on the number of actuators AC.

The MPU 50 is a main controller that controls each component of the magnetic disk device 1 in response to an instruction from the host 100 or the like. The MPU 50 controls the actuator AC through the driver IC 20 to perform servo control for positioning the head HD. For example, the MPU 50 controls the actuators AC0 and AC1 independently or in parallel through the driver IC 20. The MPU 50 controls the operation of writing data to the disk DK and selects a storage destination of write data. The MPU 50 also controls the operation of reading data from the disk DK and controls processing of read data. The MPU 50 is connected to each component of the magnetic disk device 1. The write operation includes an operation from the reception of a command to the completion of write of data to a particular area, such as a seek operation, a rotational delay, and a write process. The read operation includes an operation from the reception of a command to the completion of read of data from a particular area, such as, a seek operation, a rotational delay, and a write process. The MPU 50 is electrically connected to the driver IC 20, R/W channel 40, HDC 60, and the like. Note that two or more MPU's 50 may be provided depending on the number of actuators AC.

In response to an instruction from the MPU 50, the HDC 60 controls the read/write process and controls data transfer between the host 100 and the R/W channel 40. The HDC 60 is electrically connected to the R/W channel 40, MPU 50, volatile memory 70, buffer memory 80, nonvolatile memory 90, and the like. Note that two or more HDCs 60 may be provided depending on the number of actuators AC.

The HDC 60 includes a servo control unit 610 and a command control unit 620. The HDC 60 executes the process of each of the units on firmware. Note that the HDC 60 may include each of the units as a circuit. In addition, some of the components of the HDC 60 may be included in the MPU 50. For example, the servo control unit 610 and the command control unit 620 may be included in the MPU 50.

The servo control unit 610 controls the position of the head HD. In other words, the servo control unit 610 controls access to a particular area of the disk DK by the head HD. The servo control unit 610 includes a tracking control unit 6100 and a seek control unit 6101. Note that two or more servo control units 610 may be provided depending on the number of actuators AC.

The tracking control unit 6100 controls tracking of the head HD to a particular track of the disk DK. "Tracking the head HD to a particular track of the disk DK" may also be referred to simply as "tracking". The "tracking" includes "following a particular path or a particular track when data is written to the disk DK" and "following a particular path or a particular track when data is read from the disk DK".

The seek control unit 6101 controls a seek of the head HD from a particular track to a target track in the disk DK.

The command control unit 620 controls commands received from the host 100 or the like. For example, the command control unit 620 stores commands received from the host 100 or the like in a queue in the order received from the host 100 or the like. Based on a particular one of the commands stored in the queue, the command control unit 620 gains access to a position or an area specified by the command, for example, a sector, through the servo control unit 610. Hereinafter, "gaining access to a position or an area specified by a particular command based on the command" may also be referred to as "processing a command". The "commands stored in a queue" may also be referred to as "queued commands". Further, "storing commands in a queue" may also be referred to as "queuing".

The command control unit 620 detects or estimates the present and future operating states of an actuator AC to be currently controlled (which may also be referred to as an own actuator hereinafter) and the present and future operating states of an actuator AC other than the own actuator (which may also be referred to as the other actuator hereinafter). The operating states of the actuator AC includes a command executing state, a read/write process executing state, a seek state of a head HD corresponding to the actuator AC, a head position corresponding to the actuator AC, a head velocity corresponding to the actuator AC, a head acceleration corresponding to the actuator AC, a state of timing (or scheduled time) at which a write/read process is started by a head HD corresponding to the actuator AC, a state of timing (or scheduled time) at which a write/read process is terminated by a head HD corresponding to the actuator AC, and the like. Based on the present and future operation states of the own actuator AC and the other actuator AC, the command control unit 620 selects a particular command from the queue commands stored in the queue for each interface IF (or the actuator AC) in the order received from the host 100 or the like, and replaces the order of the selected command with the order (which may also be referred to as the subsequent order hereinafter) of a command to be processed next to the currently-processed command (which may also be referred to as the current command), thereby to process the selected command after (or during) the processing of the current command. Hereinafter, "replacing the order of a plurality of commands to be processed" may also be referred to as "command reordering" or simply "reordering". "Performing a particular arithmetic operation (computation), selecting a particular command from the commands based on the result of the particular arithmetic operation (computation), and reordering the order of the selected command" may also be referred to as "reordering arithmetic process", "reordering arithmetic operation" or "reordering process". In addition, the "command to be processed next to the current command" may also be referred to as "next processed command".

For example, based on the current and future operating states of the own actuator AC and the other actuator AC, the command control unit 620 may perform a reordering process for each interface IF (or the actuator AC) to process commands independently or in parallel for each interface IF (or the actuator AC) and to process commands within a single process for each interface IF (or the actuator AC). The command control unit 620 may start to process commands in an event-driven mode or a time-driven mode (time-shared mode), for example.

While the command control unit 620 is processing the current command, it performs an arithmetic operation based on the position of the disk DK where the head HD is currently placed, for example, the position of a data sector of the disk DK where the head HD is currently placed (which may also be referred to simply as the current position hereinafter) and a plurality of queue commands stored in the queue for each interface IF (or the actuator AC) in the order received from the host 100 or the like, and performs a reordering process based on the result of the arithmetic operation, thereby processing the next-processed command.

Based on the current and future operating states of the own actuator AC and the other actuator AC, the current position of a head HD corresponding to the own actuator AC, a plurality of queue commands stored in the queue for each interface IF (or the actuator AC) in the order received from the host 100 or the like, and a table (which may also be referred to as a reordering table or a seek profile table hereinafter) indicating the relationship in the seek distance and seek time of the head HD between the own actuator AC and the other actuator AC, the command control unit 620 calculates a plurality of times for gaining access to the position (which may also be referred to simply as a position hereinafter) of each of the sectors (data sectors) of the disk DK designated by the queue commands from the current position. Hereinafter, "a time period for which the head HD gains access to a sector (data sector) in a particular position of the disk DK (a time period required to place the head HD)" may also be referred to as "access cost". The access cost includes a time period for seeking the head HD from a particular track of the disk DK to a track other than the track (which may also be referred to as seek time hereinafter), and a rotational delay for placing the head HD at a particular disk angle of a particular sector other than the sector of the disk DK. The reordering table may vary, for example, from head HD to head HD or from actuator AC to actuator AC or the same reordering table may be used for some of the heads HD or for some of the actuators AC or the same reordering table may be used for all of the heads HD and for all of the actuators AC. In order to reduce the influence of vibration and power consumption of the magnetic disk device 1, the command control unit 620 may adjust the access cost by weighting the calculated access cost (e.g., multiplying or dividing a given value) and radially offsetting the position of the disk DK where the head HD starts to move and the position of the disk DK where the head HD moves (e.g., adding or subtracting a given value) to calculate the access cost.

Based on the current and future operating states of the own actuator AC (e.g., the current position of a head HD corresponding to the own actuator AC), the current and future operating states of the other actuator AC, and the result of calculation of access costs corresponding to the queue commands of the own actuator AC and other actuator AC stored in the queue for each interface IF (or the actuator AC), the command control unit 620 selects, as a next-processed command, a command (which may also be referred to as a low-cost command hereinafter) for specifying a position accessible at an access cost, which is shorter (or smaller) than the cost of access to a position specified by a command different from the current command (which may also be referred to as a different command hereinafter) from the current position of a head HD corresponding to the own actuator AC, from at least one of the queue commands of the own actuator AC and the other actuator AC, and then changes the order of the low-cost command selected in at least one of the queue commands to the next order. Hereinafter, information for the reordering arithmetic process, such as information on the current and future operating states of the own actuator AC and other actuator AC, information on a plurality of queue commands corresponding to the own actuator AC and other actuator AC, information on a plurality of positions respectively designated by the queue commands corresponding to the own actuator AC and other actuator AC, reordering tables of the own actuator AC and other actuator AC, and information on seeking from the current position of the head HD to a plurality of positions respectively designated by the queue commands corresponding to the own actuator AC and other actuator AC, may also be referred to as reordering information. Note that the reordering information may not include a reordering table. The reordering information may include information other than the above information. The position information corresponds to, for example, at least one information of a head, a track, a sector, a radial position and a disk angle, or information of a combination thereof. Hereinafter, for convenience of description, "cost of access from a particular position to another position" may also be referred to as "access cost of a particular command" or "access cost corresponding to a particular command". As described above, the command control unit 620 calculates access cost corresponding to each queue command of the own actuator AC and the other actuator AC based on the reordering information, selects a low-cost command from the queue commands based on the result of calculation of the access cost, performs a reordering arithmetic process for changing the order of the selected low-cost command to the next order, and processes the low-cost command after processing the current command. The command control unit 620 may record the reordering information in a particular recording area, such as the system area DKb of the disk DK, the volatile memory 70, the buffer memory 80, and the nonvolatile memory 90. Note that the command control unit 620 may record the reordering information other than the reordering table in a particular recording area, such as the system area DKb of the disk DK, the volatile memory 70, the buffer memory 80, and the nonvolatile memory 90. In this case, the command control unit 620 may record the reordering table in a particular recording area, such as the system area DKb of the disk DK, the volatile memory 70, the buffer memory 80, and the nonvolatile memory 90, separately from the reordering information. The command control unit 620 may also calculate the reordering table.

For example, based on the reordering information, the command control unit 620 calculates a plurality of access costs of the queue commands of the own actuator AC and other actuator AC stored in the queue for each interface IF (or the actuator AC). Based on the reordering information and the result of the calculation of the access costs, a command control unit 620 selects a command (which may also be referred to as the lowest-cost command) for designating a position, which is accessible at the shortest (or smallest) access cost from the current position, as a next processing command from the queue commands, and changes the order of the lowest-cost command selected from the queue commands to the next order. As described above, the command control unit 620 calculates access costs corresponding to the queue commands of the own actuator AC and other actuator AC based on the reordering information, selects a lowest-cost command from the queue commands based on the result of the calculation of the access costs, performs a reordering arithmetic process of changing the order of the selected lowest-cost command to the next order, and processes the lowest-cost command after (or during) the processing of the current command. The command control unit 620 may calculate a plurality of access costs of the queue commands of the own actuator AC and other actuator AC stored in a queue for each interface IF (or the actuator AC) based on the reordering information other than the reordering table, select a low-cost command (or the lowest-cost command) from the queue commands as a next-processed command based on the reordering information other than the reordering table and the result of the calculation of the access costs, change the order of the selected low-cost command (or the lowest-cost command) to the next order, and process the low-cost command (or the lowest-cost command) after (or during) the processing or the current command.

For example, based on the reordering information such as the current and future operating states of the own actuator AC and otter actuator AC and the result of calculation of the access costs of the queue commands of the own actuator AC (or the other actuator AC) stored in the queue for each interface IF (or the actuator AC), the command control unit 620 selects, as the next processed-command, a lowest-cost command, which is capable of minimizing performance degradation due to mutual interference between the own actuator AC and the other actuator AC, from the queue commands of the own actuator AC (or the other actuator AC), and changes the order of the lowest-cost command selected from the queue commands of the own actuator AC (or the other actuator AC) to the next order.

For example, when the other actuator AC does not process the command, the command control unit 620 selects a lowest-cost command as a next-processed command from the queue commands of the own actuator AC based on the reordering information such as the current and future operating states of the own actuator AC and other actuator AC and the result of calculation of the access cost of each of the queue commands of the own actuator AC stored in the queue for each interface IF (or the actuator AC), and changes the order of the lowest-cost command selected from the queue commands of the own actuator AC to the next order.

For example, when the command control unit 620 determines that the other actuator AC is performing a read/write operation and terminates the read/write operation in a short time, it selects, as a next-processed command, a lowest-cost command, which specifies a position accessible at the shortest (or smallest) access cost from the timing when the other actuator AC terminated its read/write operation, from the queue commands of the own actuator AC, based on the reordering information such as the current and future operating states of the own actuator AC and other actuator AC and the result of calculation of the access cost of each of the queue commands of the own actuator AC stored in the queue for each interface IF (or the actuator AC), and changes the order of the lowest-cost command selected from the queue commands of the own actuator AC to the following order.

For example, when the command control unit 620 determines that the other actuator AC is performing its read/write operation and a long time is required to terminate the read/write operation, it selects, as a next-processed command, a lowest-cost command, which specifies a position accessible at the shortest (or smallest) access cost under a seek condition that the read/write operation can be performed with a seek current such that the read/write operation is not influenced by the mutual interference between the own actuator AC and the other actuator AC, from the queue commands of the own actuator AC, based on the reordering information such as the current and future operating states of the own actuator AC and other actuator AC and the result of calculation of the access cost of each of the queue commands of the own actuator AC and other actuator AC stored in the queue for each interface IF (or the actuator AC), and changes the lowest-cost command selected from the queue commands of the own actuator AC to the next order.

For example, when the other actuator AC is performing its read/write operation, the command control unit 620 selects a lowest-cost command as a next-processed command from the queue commands of the own actuator AC, based on the current and future operating states of the own actuator AC and other actuator AC and the result of calculation of the access cost of each of the queue commands of the own actuator AC and other actuator AC stored in the queue for each interface IF (or the actuator AC). The command control unit 620 predicts timing influenced by mutual interference between the own actuator AC and the other actuator AC by the seek operation of the other actuator AC. When a read operation or a write operation corresponding to the other actuator AC is performed at the timing of the selected command (e.g., the lowest-cost command), the command control unit 620 excludes the selected command (e.g., the lowest-cost command). When the write or read operation corresponding to the other actuator AC is performed at the timing of the selected command (e.g., the lowest-cost command), the command control unit 620 selects, as a next processed-command, a lowest-cost command from the queue commands other than the excluded command based on the current and future operating states of the own actuator AC and other actuator AC and the result of calculation of the access cost of each of the queue commands of the own actuator AC and other actuator AC stored in the queue for each interface IF (or the actuator AC). When the write or read operation corresponding to the other actuator AC is not performed at the timing of the selected command (e.g., the lowest-cost command), the command control unit 620 changes the order of the lowest-cost command selected from the queue commands to the next order. Note that the timing influenced by the seek operation of the other actuator AC varies according to whether a write operation or a read operation is performed. For example, the read operation is less influenced.

For example, the command control unit 620 may add information on the mutual interference between the own actuator AC and the other actuator AC to the reordering table to execute reordering in accordance with an, allowable level of the mutual interference between the own actuator AC and the other actuator AC. The allowable level of the mutual interference between the own actuator AC and the other actuator AC varies according to whether a command under execution indicates a write operation or a read operation, a combination of head numbers, a relative radial position of the mutual interference between the head HD of the own actuator AC and that of the other actuator AC, etc. For this reason, a seek profile table may be provided for each condition, or various conditions may be calculated as parameters for a base seek profile table.

The command control unit 620 counts the number of queue commands (which may also be referred to as a queue command number hereinafter). The command control unit 620 counts the number of queue commands corresponding to each actuator AC in at least one queue command.

The command control unit 620 includes a command storage unit 6200, a first reordering arithmetic operation unit 621; which performs a reordering arithmetic process for a plurality of queue commands corresponding to the actuator AC0, and a second reordering arithmetic operation unit 6211 which performs a reordering arithmetic process for a plurality of queue commands corresponding to the actuator AC1. Note that two or more command control units 620 may be provided depending on the number of actuators AC.

The command storage unit 6200 includes a queue. The command storage unit 6200 may include a plural-ty of queues corresponding to their respective actuators AC or may include a combination of queues (which may also be referred to as a composite queue) corresponding to the actuators AC. For example, the command storage unit 6200 way include a queue corresponding to the actuator AC0 and a queue corresponding to the actuator AC1 or may include a combination of queues corresponding to the actuators AC0 and AC1.

The command storage unit 6200 stores a command received from the host 100 or the like in a queue. For example, the command storage unit 6200 may store, in the composite queue, a plurality of commands corresponding to the actuator AC0 received from the host 100 or the like and a plurality of commands corresponding to the actuator AC1 received from the host 100 or the like in the order received from the host 100 or the like from the same direction. The command storage unit 6200 may store a plurality of commands corresponding to the actuator AC0 received from the host 100 or the like in the composite queue in the order received from the host 100 or the like, and may store a plurality of commands corresponding to the actuator AC1 received from the host 100 or the like in the composite queue in the order received from the host 100 or the like from the direction opposite to the commands corresponding to the actuator AC0.

The command storage unit. 6200 can store commands corresponding to the number of commands (which may also be referred to as a queue depth (QD)) that can be stored in a queue specified by the host 100 or the like. When the number of queue commands corresponding to a particular actuator AC is the number of commands corresponding to the QD corresponding to the actuator AC, the command storage unit 6200 does not receive any command corresponding to the actuator AC from the host 100 or the like. When the number of queue commands corresponding to a particular actuator AC is smaller than the 0D corresponding to the actuator AC, the command storage unit 6200 stores commands corresponding to the actuator AC received from the host 100 or the like in a queue. For example, when the QD corresponding to the actuator AC1 is three and the number of queue commands corresponding to the actuator AC1 is three, the command storage unit 6200 does not receive any command corresponding to the actuator AC1 from the host 100 or the like. When the QD corresponding to the actuator AC1 is three and the number of queue commands corresponding to the actuator AC1 is two, the command storage unit 6200 stores the commands corresponding to the actuator AC1 received from the host 100 or the like in a queue corresponding to the actuator AC1.

Figure 3:
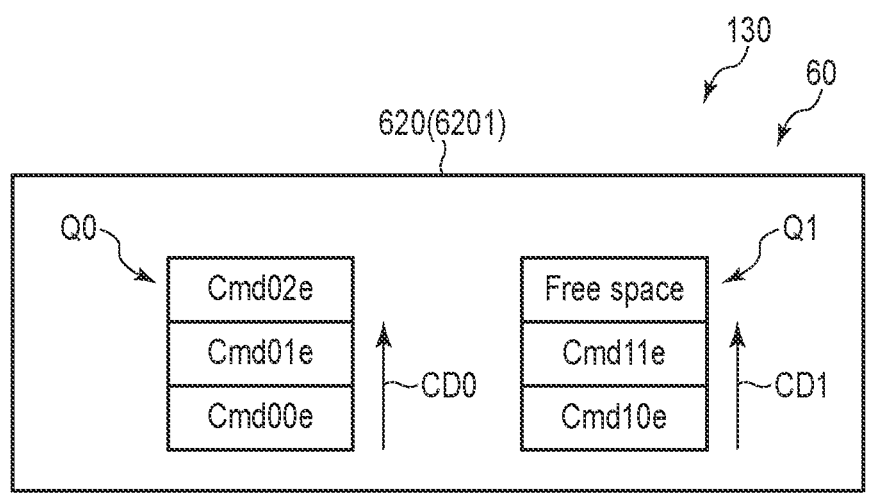
FIG. 3 is a schematic diagram snowing an example of a queue.

FIG. 3 is a schematic diagram showing an example of queues Q0 and Q1. In FIG. 3, the command storage unit 6200 includes a queue Q0 for storing a command corresponding to the actuator AC0 and a queue Q1 for storing a command corresponding to the actuator AC1. In the example shown in FIG. 3, the QD of the queues Q0 and Q1 is three. The QD of the queues Q0 and Q1 may be two or less and four or more. In FIG. 3, the queue Q0 stores commands Cmd00e, Cmd01e and Cmd02e. The commands Cmd00e, Cmd01e and Cmd02e are transferred from the host 100 or the like in the order presented. The commands Cmd00e, Cmd01e and Cmd02e correspond to the actuator AC0. In FIG. 3, the queue Q1 stores commands Cmd10e and Cmd11e. The commands Cmd10e and Cmd11e are transferred from the host 100 or the like in the order presented. The commands Cmd10e and Cmd11e correspond to the actuator AC1. FIG. 3 shows a direction CD0 in which a command is stored in the queue Q0 (which may also be referred to as a storage direction) and a direction CD1 in which a command is stored in the queue Q1.

In the example shown in FIG. 3, the command storage unit 6200 stores the commands Cmd00e, Cmd01e and Cmd02e in the queue Q0 in the order presented along the storage direction CD0, and stores the commands Cmd10e and Cmd11e in the queue Q1 in the order presented along the storage direction CD1.

Since the number of queue commands (=3) corresponding to the actuator AC0 stored in the queue QC is the number of commands (=3) corresponding to the QD, the command storage unit 6200 does not receive the command corresponding to the actuator AC0 from the host 100 or the like. Since the number of queue commands (=2) corresponding to the actuator AC1 stored in the queue Q1 is smaller than QD (=3), the command storage unit 6200 can receive a command corresponding to the actuator AC1 from the host 100 or the like and store it in the queue Q1.

The first reordering arithmetic operation unit 6210 performs a reordering arithmetic process for a plurality of queue commands corresponding to the actuator AC0. For example, during the processing of the current command, the first reordering arithmetic operation unit 6210 performs a reordering arithmetic process for a plurality of queue commands corresponding to the actuator AC0 received from the host 100 or the like.

In one example, based on information on the current position of the head HD0, information on a plurality of queue commands corresponding to the actuator AC0, and reordering information corresponding to the actuator AC0, such as a reordering table corresponding to the actuator AC0, the first reordering arithmetic operation unit 6210 calculates an access cost (which may also be referred to as a next-estimated cost hereinafter) from the current position of the head HD0 to a plurality of positions respectively designated by a plurality of queue commands (which way also be referred to as the next-processed prospect commands hereinafter) which may be processed next to the current command among the queue commands corresponding to the actuator AC0. In order to reduce the influence of vibration and power consumption of the magnetic disk device 1, the first reordering arithmetic operation unit 6210 may adjust the calculated access cost (next-estimated cost) by weighting the access cost (next-estimated cost) (e.g., multiplying or dividing a given value) and radially offsetting the position of the disk DK0 where the head HD0 starts to move and the position of the disk DK0 where the head HD0 moves (e.g., adding or subtracting a given value). Based on the result of calculation of the next-estimated cost, the first reordering arithmetic operation unit 6210 selects a low-cost command (or a lowest-cost command) from the next-processed prospect commands and changes the order of the low-cost command (or the lowest-cost command) selected from the next-processed prospect commands to the next order.

The first reordering arithmetic operation unit 6210 may record, for example, reordering information corresponding to the actuator AC0 in a particular recording area, for example, the system area DKb0 of the disk DK0, the volatile memory 70, the buffer memory 80, and the nonvolatile memory 90. Note that the first reordering arithmetic operation unit 6210 may record reordering information corresponding to the actuator AC0 other than the reordering table corresponding to the actuator AC0 in a particular recording area, for example, the system area DKb0 of the disk DK0, the volatile memory 70, the buffer memory 80, and the nonvolatile memory 90. In this case, the first reordering arithmetic operation unit 6210 may record a reordering table corresponding to the actuator AC0 in a particular recording area, for example, the system area DKb0 of the disk DK0, the volatile memory 70, the buffer memory 80, and the nonvolatile memory 90, separately from the reordering information corresponding to the actuator AC0. The first reordering arithmetic operation unit 6210 may record a reordering table corresponding to each actuator AC, for example, a reordering table corresponding to the actuator AC0 and a reordering table corresponding to the actuator AC1, in a particular recording area, for example, the system area DKb0 of the disk DK0, the volatile memory 70, the buffer memory 80, and the nonvolatile memory 90. The first reordering arithmetic operation unit 6210 may also record reordering tables corresponding to a plurality of actuators AC, for example, reordering tables corresponding to the actuators AC0 and AC1, in a particular recording area, for example, the system area DKb0 of the disk DK0, the volatile memory 70, the buffer memory 80, and the nonvolatile memory 90. The first reordering arithmetic operation unit 6210 may obtain a reordering table corresponding to the actuator AC1 by calculation. The first reordering arithmetic operation unit 6210 may obtain a reordering table corresponding to the actuator AC0 and a reordering table corresponding to the actuator AC1 by calculation. The first reordering arithmetic operation unit 6210 may obtain reordering tables corresponding to the actuators AC0 and AC1 by calculation.

The second reordering arithmetic operation unit 6211 performs a reordering arithmetic process for a plurality or queue commands corresponding to the actuator AC1. For example, during the processing of the current command, the second reordering arithmetic operation unit 6211 performs a reordering arithmetic process for a plurality of queue commands corresponding to the actuator AC1 received from the host 100 or the like.

In one example, based on information on the current position of the head HD1, information on a plurality of queue commands corresponding to the actuator AC1, and reordering information corresponding to the actuator AC1, such as a reordering table corresponding to the actuator AC1, the second reordering arithmetic operation unit 6211 calculates a plurality of next-estimated costs from the current position of the head HD1 to a plurality of positions respectively designated by a plurality of next-processed prospect commands of the queue commands corresponding to the actuator AC1. In order to reduce the influence of vibration and power consumption of the magnetic disk device 1, the second reordering arithmetic operation unit 6211 may adjust the calculated access costs (next-estimated costs) by weighting the access costs (next-estimated costs) (e.g., multiplying or dividing a given value) and radially offsetting the position of the disk DK1 where the head HD1 starts to move and the position of the disk DK1 where the head HD1 moves (e.g., adding or subtracting a given value). Based on the result of calculation of the next-estimated costs, the second reordering arithmetic operation unit 6211 selects a low-cost command (or a lowest-cost command) from the next-processed prospect commands and changes the order of the low-cost command (or the lowest-cost command) selected from the next-processed prospect commands to the next order. The reordering table corresponding to the actuator AC1 may be the same as or different from the reordering table corresponding to the actuator AC0.

The second reordering arithmetic operation unit 6211 may record, for example, reordering information corresponding to the actuator AC1 in a particular recording area, for example, the system area DKb1 of the disk DK1, the volatile memory 70, the buffer memory 80, and the nonvolatile memory 90. Note that the second reordering arithmetic operation unit 6211 may record reordering information corresponding to the actuator AC1 other than the reordering table corresponding to the actuator AC1 in a particular recording area, for example, the system area DKb1 of the disk DK1, the volatile memory 70, the buffer memory 80, and the nonvolatile memory 90. In this case, the second reordering arithmetic operation unit 6211 may record a reordering table corresponding to the actuator AC1 in a particular recording area, for example, the system area DKb1 of the disk DK1, the volatile memory 70, the buffer memory 80, and the nonvolatile memory 90, separately from the reordering information corresponding to the actuator AC. The second reordering arithmetic operation unit 6211 may record a reordering table corresponding to each actuator AC, for example, a reordering table corresponding to the actuator AC0 and a reordering table corresponding to the actuator AC1, in a particular recording area, for example, the system area DKb1 of the disk DK1, the volatile memory 70, the buffer memory 80, and the nonvolatile memory 90. The second reordering arithmetic operation unit 6211 may also record reordering tables corresponding to a plurality of actuators AC, for example, reordering tables corresponding to the actuators AC0 and AC1, in a particular recording area, for example, the system area DKb1 of the disk DK1, the volatile memory 70, the buffer memory 80, and the nonvolatile memory 90. The second reordering arithmetic operation unit 6211 may obtain a reordering table corresponding to the actuator AC1 by calculation. The second reordering arithmetic operation unit 6211 may obtain a reordering table corresponding to the actuator AC0 and a reordering table corresponding to the actuator AC1 by calculation. The second reordering arithmetic operation unit 6211 may obtain reordering tables corresponding to the actuators AC0 and AC1 by calculation.

Based on the result of calculation of the access cost of each of the queue commands corresponding to the actuator AC1, the second reordering arithmetic operation unit 6211 selects a low-cost command (or a lowest-cost command) from the queue commands corresponding to the actuator AC1, and changes the order of the low-cost command (or the lowest-cost command; selected from the queue commands to the next order.

In one example, based on the result of calculation of some next-estimated costs of some next-processed prospect commands of the queue commands corresponding to the actuator AC1, the second reordering arithmetic operation unit 6211 selects a low-cost command (or a lowest-cost command)

from the queue commands corresponding to the actuator AC1, and changes the order of the low-cost command (or the lowest-cost command; selected from the next-processed prospect commands corresponding to the actuator AC1 to the next order.

Figure 4:
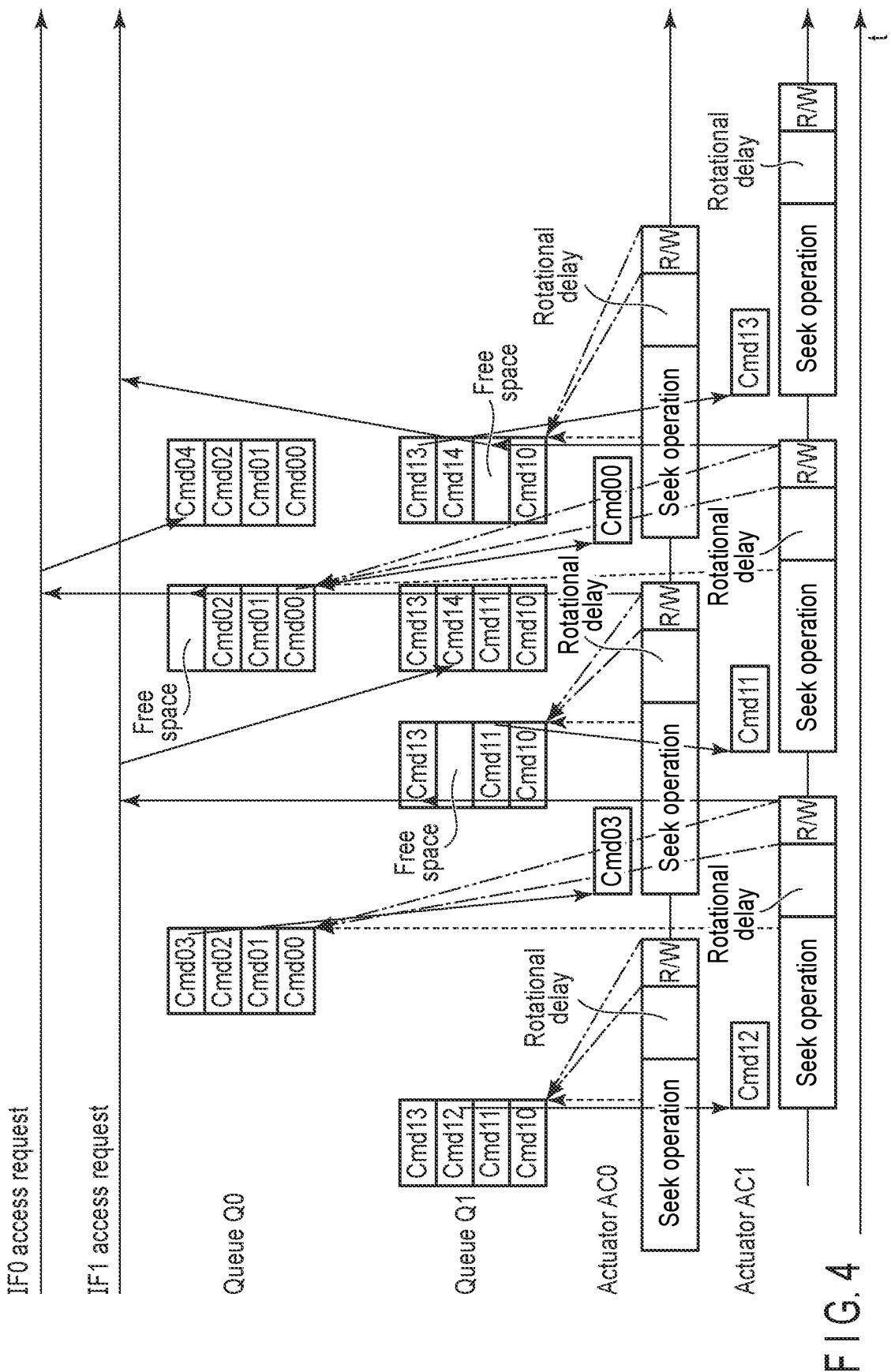
FIG. 4 is a time sequence showing an example of a reordering process according to the embodiment.

FIG. 4 is a time sequence showing an example of the reordering process according to the present embodiment. FIG. 4 shows an IF0 access request that is input and output to and from the actuator AC) via the interface IF0 and an IF1 access request that is input and output to and from the actuator AC1 via the interface IF1. FIG. 4 shows queues Q0 and Q1. As shown in FIG. 4, the queue Q0 may store commands (queue commands) Cmd00, Cmd01, Cmd02, Cmd03 and Cmd04, and the queue Q1 may store commands (queue commands) Cmd10, Cmd11, Cmd12, Cmd13 and Cmd14. FIG. 4 shows a command process (or a read/write operation) of the actuator AC0 and a command process (or a read/write operation) of the actuator AC1. Assume in FIG. 4 that time t elapses toward the head of the arrow. That is, in FIG. 4, the direction toward the head of the arrow corresponds to the future of time t and its opposite direction corresponds to the past of time t.

In the example shown in FIG. 4, during the read/write operation in the actuator AC0, the system controller 130 acquires information on the seek operation of the head HD0 in the read/write operation of the actuator AC0 and information on the start timing and end timing of the read/write operation of the head HD0. During the read/write process in the actuator AC0, the system controller 130 selects lowest-cost command Cmd12 from the queue commands Cmd10, Cmd11, Cmd12 and Cmd13 stored in the queue Q1 of the actuator AC1, and changes the order of the selected lowest-cost command Cmd12 to the next order. The system controller 130 causes the actuator AC1 to start the read/write operation of the command Cmd12.

In the example shown in FIG. 4, during the read/write operation corresponding to the command Cmd12 in the actuator AC1, the system controller 130 acquires information on the seek operation of the head HD1 in the read/write operation corresponding to the command Cmd12 in the actuator AC1 and information on the start timing and end timing of the read/write operation of the head HD1 corresponding to the command Cmd12. The system controller 130 selects a lowest-cost command Cmd03, which specifies a position accessible at the lowest access cost from the timing when the read/write operation is terminated in the actuator AC0, from the commands Cmd00, Cmd01, Cmd02 and Cmd03 stored in the queue Q0 of the actuator AC0, and changes the order of the selected lowest-cost command Cmd03 to the next order. After the read/write operation is terminated in the actuator AC0, the system controller 130 causes the actuator AC0 to start a read/write operation corresponding to the command Cmd03.

In the example shown in FIG. 4, during the read/write operation corresponding to the command Cmd03 in the actuator AC0, the system controller 130 acquires information on the seek operation of the head HD0 in the read/write operation corresponding to the command Cmd03 in the actuator AC0 and information on the start timing and end timing of the read/write operation of the head HD0 corresponding to the command Cmd03. When the read/write operation corresponding to the command Cmd12 is terminated during the read/write operation corresponding to the command Cmd03 in the actuator AC0, the system controller 130 receives the termination of the read/write operation corresponding to the command Cmd12 via the interface IF1. The system controller 130 acquires information that there is a free space in the queue Q1 corresponding to the actuator AC1. The system controller 130 selects a lowest-cost command Cmd11, which specifies a position accessible at the lowest access cost from the timing when the read/write operation corresponding to the command Cmd12 is terminated in the actuator AC1, from the commands Cmd10, Cmd11 and Cmd13 stored in the queue Q1 of the actuator AC1, and changes the order of the selected lowest-cost command Cmd11 to the next order. After the read/write operation corresponding to the command Cmd12 is terminated in the actuator AC1, the system controller 130 causes the actuator AC1 to start a read/write operation corresponding to the command Cmd11.

In the example shown in FIG. 4, during the read/write operation corresponding to the command Cmd11 in the actuator AC1, the system controller 130 acquires information on the seek operation of the head HD1 in the read/write operation corresponding to the command Cmd11 in the actuator AC1 and information on the start timing and end timing of the read/write operation of the head HD1 corresponding to the command Cmd11. When the read/write operation corresponding to the command Cmd03 is terminated during the read/write operation corresponding to the command Cmd11 in the actuator AC1, the system controller 130 receives the termination of the read/write operation corresponding to the command Cmd03 via the interface IF0. The system controller 130 acquires information that there is a free space in the queue Q0 corresponding to the actuator AC0.

The system controller 130 selects a lowest-cost command Cmd00, which specifies a position accessible at the lowest access cost from the timing when the read/write operation corresponding to the command Cmd03 is terminated in the actuator AC0, from the commands Cmd00, Cmd01 and Cmd02 stored in the queue Q0 of the actuator AC0, and changes the order of the selected lowest-cost command Cmd00 to the next order. After the read/write operation corresponding to the command Cmd03 is terminated in the actuator AC0, the system controller 130 causes the actuator AC0 to start a read/write operation corresponding to the command Cmd00.

The system controller 130 receives the command Cmd14 via the interface IF1 during the read/write operation corresponding to the command Cmd11 in the actuator AC1. The system controller 130 receives the command Cmd04 via the interface IF0 during the read/write operation corresponding to the command Cmd11 in the actuator AC1.

In the example shown in FIG. 4, during the read/write operation corresponding to the command Cmd00 in the actuator AC0, the system controller 130 acquires information on the seek operation of the head HD0 in the read/write operation corresponding to the command Cmd00 in the actuator AC0 and information on the start timing and end timing of the read/write operation of the head HD0 corresponding to the command Cmd00. When the read/write operation corresponding to the command Cmd11 is terminated during the read/write operation corresponding to the command Cmd00 in the actuator AC0, the system controller 130 receives the termination of the read/write operation corresponding to the command Cmd11 via the interface IF1. The system controller 130 acquires information that there is a free space in the queue Q1 corresponding to the actuator AC1.

The system controller 130 selects a lowest-cost command Cmd13, which specifies a position accessible at the lowest access cost from the timing when the read/write operation corresponding to the command Cmd11 is terminated in the actuator AC1, from the commands Cmd10, Cmd13 and Cmd14 stored in the queue Q1 of the actuator AC1, and changes the order of the selected lowest-cost command Cmd13 to the next order. After the read/write operation corresponding to the command Cmd11 is terminated in the actuator AC1, the system controller 130 causes the actuator AC1 to start a read/write operation corresponding to the command Cmd13.

Figure 5:
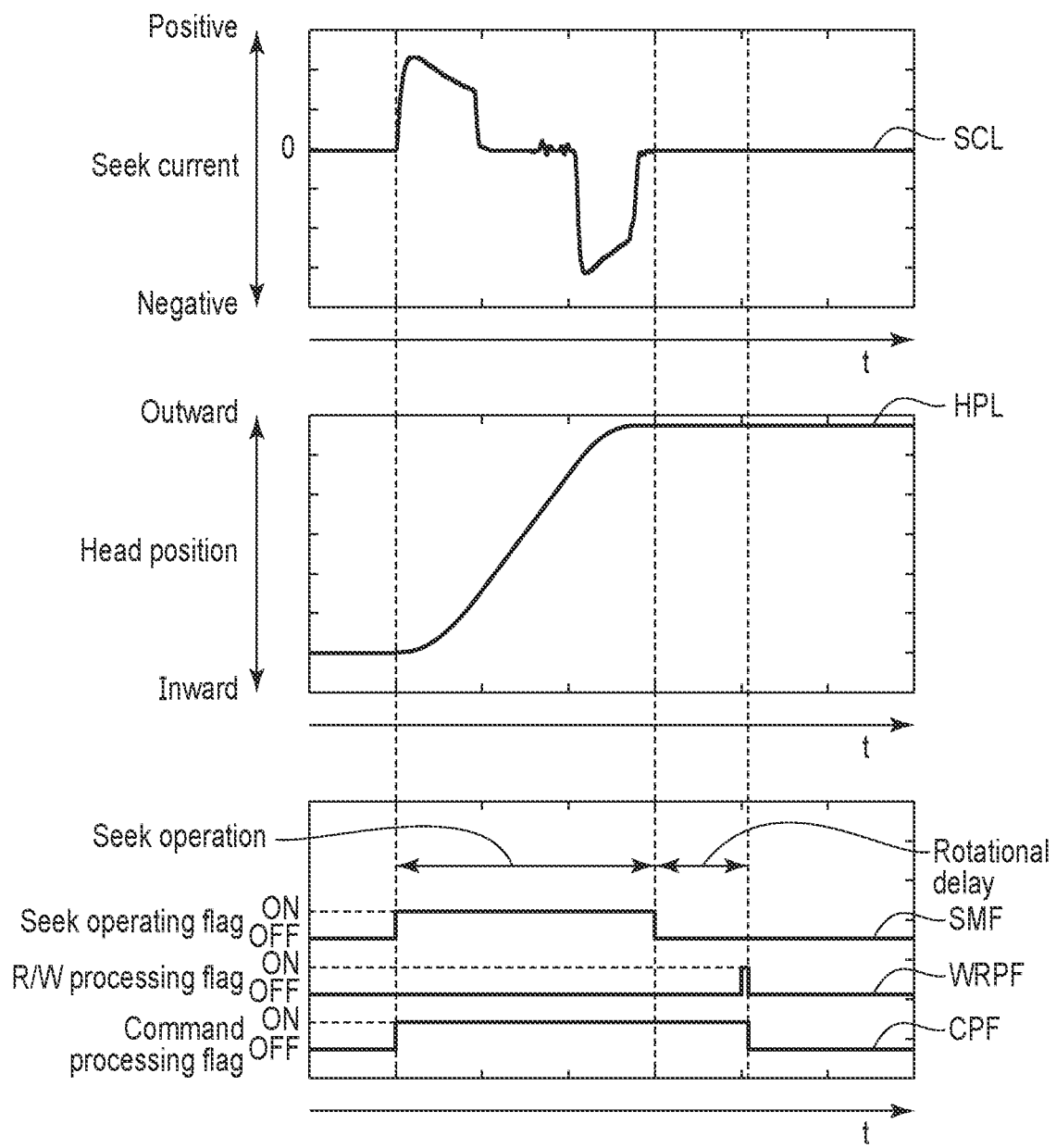
FIG. 5 is a schematic diagram snowing an example of read/write operation according to the embodiment.

FIG. 5 is a schematic diagram showing an example of the read/write operation according to the present embodiment. FIG. 5 shows variations SCL in seek current with time t (which may also be referred to as seek current variations hereinafter). The horizontal axis of the seek current variations SCL indicates time t, and the vertical axis thereof indicates a seek current. In the horizontal axis, time t elapses toward the head of the arrow. In the vertical axis, the seek current increases in positive value toward the positive direction of the double-headed arrow relative to the origin (=0), and decreases in negative value toward the negative direction of the double-headed arrow relative to the origin (=0). FIG. 5 also shows variations HPL in head position with time t (which may also be referred to as head position variations hereinafter). The horizontal axis of the head position variations HPL indicates time t, and the vertical axis thereof indicates a head position. In the horizontal axis, time t elapses toward the head of the arrow. In the vertical axis thereof, the head position moves outward toward the outward direction of the double-headed arrow, and moves inward toward the inward direction of the double-headed arrow. Note that in the vertical axis of the head position variations HPL, the "outward" and the "inward" may be reversed. In addition, FIG. 5 shows a flag SMF during seek operation for time t (which may also be referred to as a seek operating flag hereinafter), a flag WRPF during read/write operation for time t (which may also be referred to as a read/write operating flag hereinafter), and a flag CPF during command processing for time t (which may also be referred to as a command processing flag hereinafter). The seek operating flag SMF, read/write operating flag WRPF and command processing flag CPF are ON when they rise and OFF when they fall.

In the example shown in FIG. 5, the system controller 130 turns on the command processing flag CPF to start command processing (or read/write operation). Upon turning on the command processing flag CPF, the system controller 130 turns on the seek operating flag SMF to start the seek operation of the head HD. Upon turning on the seek operating flag SMF, the system controller 130 increases the seek current variations SCL toward the positive value. The system controller 130 moves the head HD from inside to outside (or changes the head position variations HPL from inside to outside).

The system controller 130 turns off the seek operating flag SMF to terminate the seek operation of the head HD. Upon turning off the seek operating flag SMF, the system controller 130 decreases the seek current variations SCL toward the negative value.

After a rotational delay from when the system controller 130 turns off the seeking operation flag, it turns on the R/W operating flag WRPF to start a R/W operation.

The system controller 130 turns off the R/W operating flag WRPF to terminate the P/W operation. Upon turning off the R/W processing flag WRPF, the system controller 130 turns off the command processing flag CPF to terminate the command processing (or read/write operation).

Figure 6:
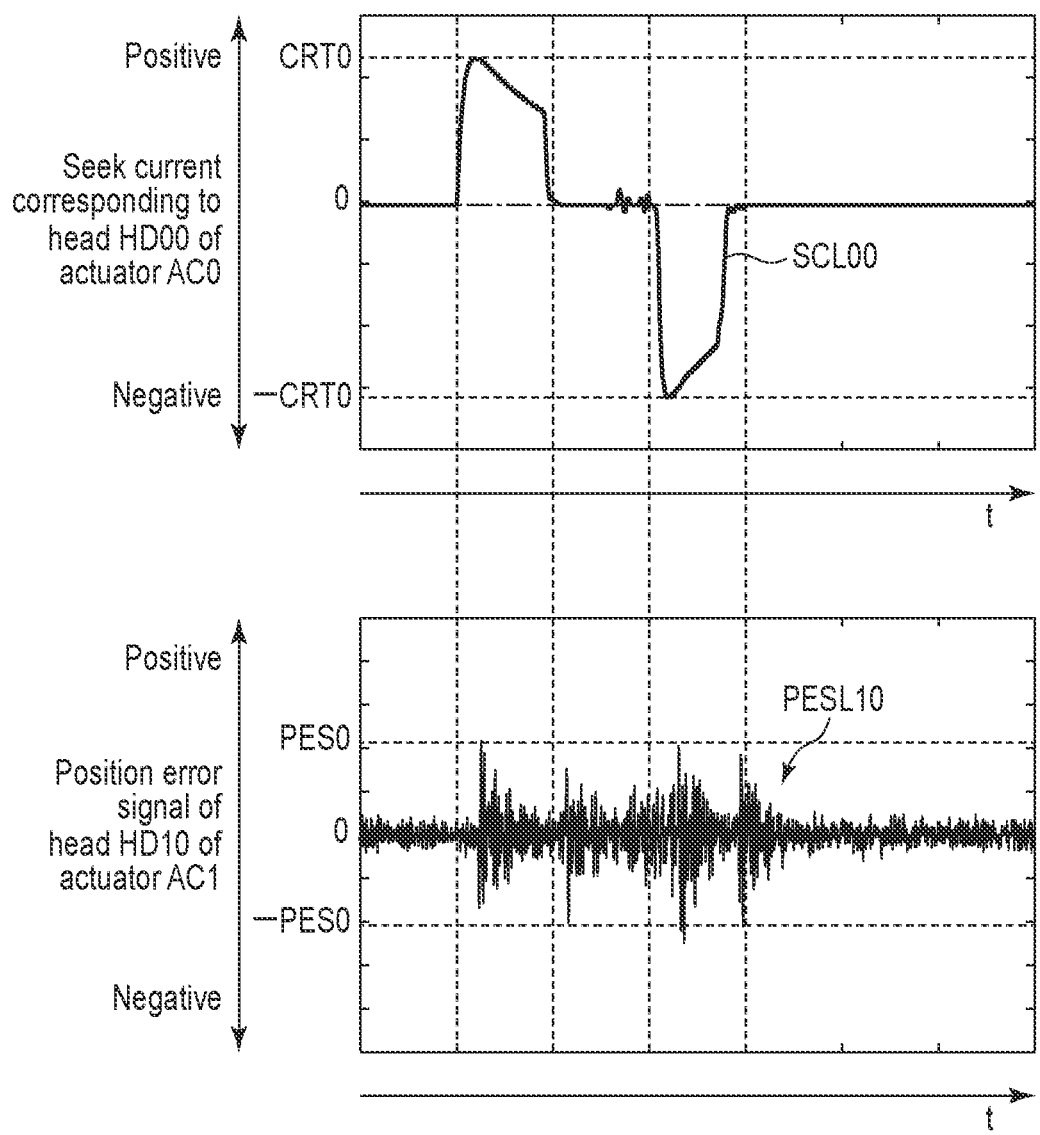
FIG. 6 is a schematic diagram showing an example of a change in a seek current corresponding to the head of an actuator according to the embodiment and a change in a position error signal of the head of another actuator.

FIG. 6 is a schematic diagram showing an example of variations SCL00 of a seek current corresponding to the head HD00 of the actuator AC0 and variations PESL10 of a position error signal of the head HD10 of the actuator AC1 according to the present embodiment. FIG. 6 shows variations SCL00 in a seek current with time t corresponding to the head HD00 (or the head HD01) of the actuator AC0 (which may also be referred to as seek current variations hereinafter). The horizontal axis of the seek current variations SCL00 indicates time t, and the vertical axis thereof indicates a seek current. In the horizontal axis, time t elapses toward the head of the arrow. In the vertical axis, the seek current increases in positive value toward the positive direction of the double-headed arrow relative to the origin (=0), and decreases in negative value toward the negative direction of the double-headed arrow relative to the origin (=0). The vertical axis of the seek current variations SCL00 indicates a seek current CRT0 and a seek current −CRT0. In FIG. 6, the seek current variations SCL00 corresponding to the head HD00 (or the head HD01) of the actuator AC0 is the maximum in the seek current CRT0 and the minimum in the seek current −CRT0. The absolute value of the seek current CRT0 and the absolute value of the seek current −CRT0 may be the same or different from each other. FIG. 6 also shows variations PESL10 in position error signal with time t corresponding to the head HD10 (or the HD11) of the actuator AC1 (which may also be referred to as position error signal variations hereinafter). The horizontal axis of the position error signal variations PESL10 indicates time t, and the vertical axis thereof indicates a position error signal. In the horizontal axis, time t elapses toward the head of the arrow. In the vertical axis, the position error signal increases in positive value toward the positive direction of the double-headed arrow relative to the origin (=0), and decreases in negative value toward the negative direction of the double-headed arrow relative to the origin (=0). The vertical axis of the position error signal variations PESL10 indicates a position error signal PES0 and a position error signal −PES0. In FIG. 6, the position error signal variations PESL10 of the head HD10 (or the head HD11; of the actuator AC1 are made in the range of the position error signals PES0 to −PES0. The absolute value of the position error signal PES0 and the absolute value of the position error signal −PES0 may be the same or different from each other.

In the example shown in FIG. 6, the system controller 130 applies a seek current to the actuator AC0 to seek the head HD00 (or the HD01) and cause the head HD10 (or the HD11) of the actuator AC1 to access a particular area of the disk DK1. The position error signal variations PESL10 in a particular area accessed by the head HD10 (or the head HD11) of the actuator AC1 are made according to the seek current variations SCL00 corresponding to the head HD00 (or the head HD01) of the actuator AC0. That is, when a seek current is applied to the actuator AC0 to seek the head HD00 (or the HD01), a position error signal in a particular area accessed by the head HD10 (or the head HD11) of the actuator AC1 is influenced. Even though a seek current is applied to the actuator AC1 to seek the head HD10 (or the HD11) and to access a particular area of the disk DK0 by the head HD01 (or the head HD00) of the actuator AC0, an influence similar to that when a seek current is applied to the actuator AC0 to seek the head HD00 (or the HD01) and to access a particular area of the disk DK1 by the head HD10 (or the head HD11) of the actuator AC1, may be caused.

FIG. 7 is a schematic diagram showing an example of variations SCL01 of a seek current corresponding to the head HD00 of the actuator AC0 and variations PESL11 of a position error signal of the head HD11 of the actuator AC1 according to the present embodiment. FIG. 7 shows variations SCL01 in the seek current corresponding to the head HD00 (or the head HD01) of the actuator AC0. The horizontal axis of the seek current variations SCL01 indicates time t, and the vertical axis thereof indicates a seek current. In the horizontal axis, time t elapses toward the head of the arrow. In the vertical axis, the seek current increases in positive value toward the positive direction of the double-headed arrow relative to the origin (=0), and decreases in negative value toward the negative direction of the double-headed arrow relative to the origin (=0). The vertical axis of the seek current variations SCL01 indicates a seek current CRT1 and a seek current −CRT1. In FIG. 7, the seek current variations SCL01 corresponding to the head HD00 (or the head HD0) of the actuator AC0 is the maximum in the seek current CRT1 and the minimum in the seek current −CRT1. The absolute value of the seek current CRT1 and the absolute value of the seek current −CRT1 may be the same or different from each other. FIG. 7 also shows position error signal variations PESL11 corresponding to the head HD11 (or the HD10) of the actuator AC1. The horizontal axis of the position error signal variations PESL11 indicates time t, and the vertical axis thereof indicates a position error signal. In the horizontal axis, time t elapses toward the head of the arrow. In the vertical axis, the position error signal increases in positive value toward the positive direction of the double-headed arrow relative to the origin (=0), and decreases in negative value toward the negative direction of the double-headed arrow relative to the origin (=0). The vertical axis of the position error signal variations PESL11 indicates a position error signal PES1 and a position error signal −PES1. In PTG. 7, the position error signal variations PESL11 of the head HD11 (or the head HD10) of the actuator AC1 are made in the range of the position error signals PES1 to −PES1. The absolute value of the position error signal PES1 and the absolute value of the position error signal −PES1 may be the same or different from each other.

In the example shown in FIG. 7, the system controller 130 applies a seek current to the actuator AC0 to seek the head HD00 (or the HD01) and cause the head HD11 (or the HD10) of the actuator AC1 to access a particular area of the disk DK1. The position error signal variations PESL11 in a particular area accessed by the head HD11 (or the head HD10) of the actuator AC1 are made according to the seek current variations SCL01 corresponding to the head HD01 (or the head HD00) of the actuator AC0. That is, when a seek current is applied to the actuator AC0 to seek the head HD00 (or the HD01), a position error signal in a particular area accessed by the head HD11 (or the head HD10) of the actuator AC1 is influenced. FIGS. 6 and 7 shows that when the same seek current is applied to actuator AC0, the influence to the head HD10 and the head HD11 are similar but the absolute values of PES0 and PES1 are not the same. Even though a seek current is applied to the actuator AC1 to seek the head HD11 (or the HD10) and to access a particular area of the disk DK0 by the head HD01 (or the head HD00) of the actuator AC0, an influence similar to that when a seek current is applied to the actuator AC0 to seek the head HD01 (or the HD00) and to access a particular area of the disk DK1 by the head HD11 (or the head HD10) of the actuator AC1, may be caused.

Figure 8:
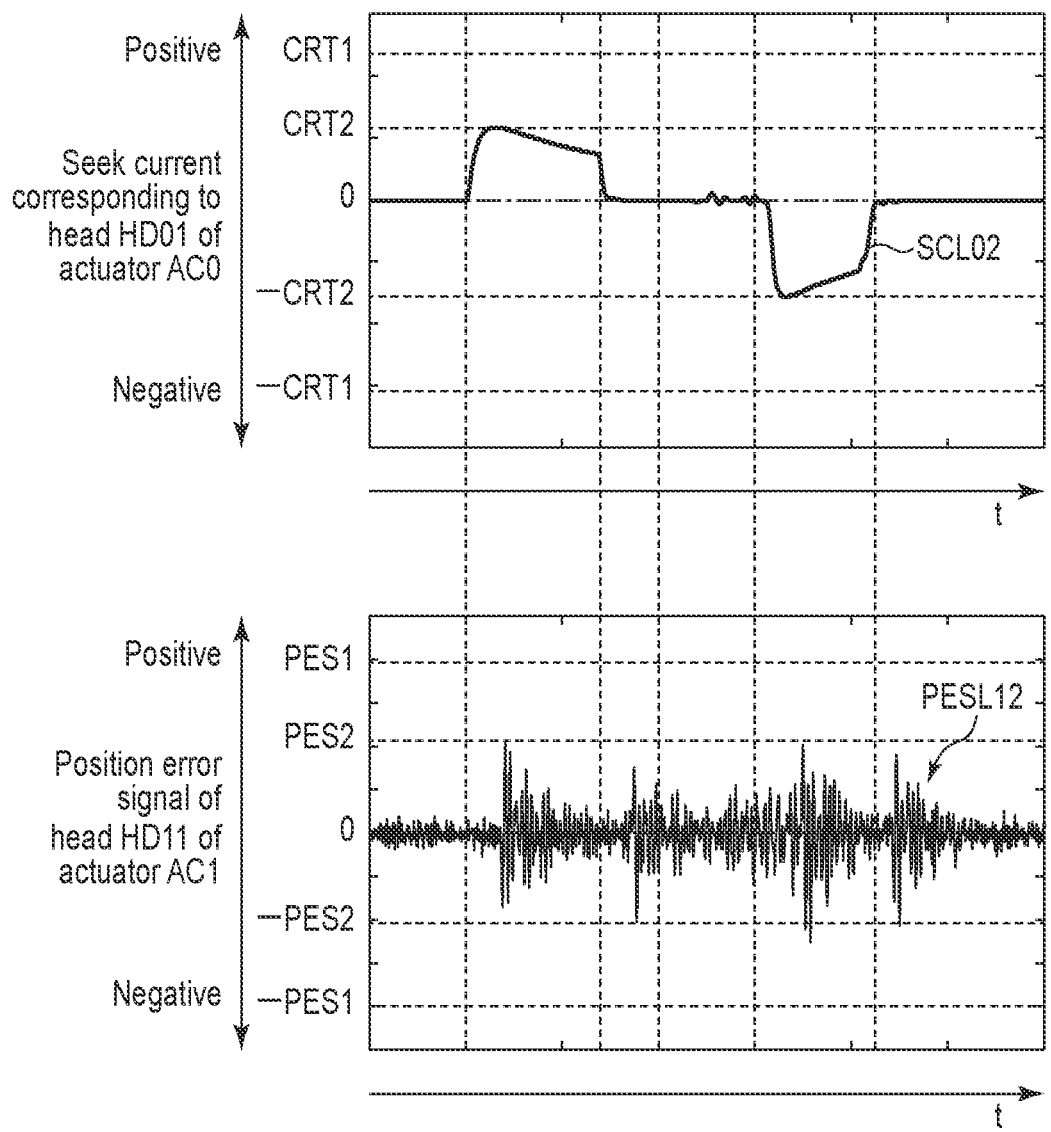
FIG. 8 is a schematic diagram showing an example of the change in a seek current corresponding to the head of an actuator according to the embodiment and the change in a position error signal of the head of another actuator.

FIG. 8 is a schematic diagram showing an example of variations SCL02 of a seek current corresponding to the head HD00 of the actuator AC0 and variations PESL12 of a position error signal of the head HD11 of the actuator AC1 according to the present embodiment. FIG. 8 shows variations SCL01 in the seek current corresponding to the head HD00 (or the head HD01) of the actuator AC0. The horizontal axis of the seek current variations SCL01 indicates time t, and the vertical axis thereof indicates a seek current. In the horizontal axis, time t elapses toward the head of the arrow. In the vertical axis, the seek current increases in positive value toward the positive direction of the double-headed arrow relative to the origin (=0), and decreases in negative value toward the negative direction of the double-headed arrow relative to the origin (=0). The vertical axis of the seek current variations SCL01 indicates a seek current CRT2 and a seek current −CRT2. In FIG. 8, the seek current variations SCL02 corresponding to the head HD00 (or the head HD01) of the actuator AC0 is the maximum in the seek current CRT2 and the minimum in the seek current −CRT2. The absolute value of the seek current CRT2 and the absolute value of the seek current −CRT2 may be the same or different from each other. The absolute value of the seek current CRT2 is smaller than the absolute value of the seek current CRT1. The absolute value of the seek current −CRT2 is smaller than the absolute value of the seek current −CRT1. FIG. 8 also shows position error signal variations PESL12 corresponding to the head HD11 (or the HD10) of the actuator AC1. The horizontal axis of the position error signal variations PESL12 indicates time t, and the vertical axis thereof indicates a position error signal. In the horizontal axis, time t elapses toward the head of the arrow. In the vertical axis, the position error signal increases in positive value toward the positive direction of the double-headed arrow relative to the origin (=0), and decreases in negative value toward the negative direction of the double-headed arrow relative to the origin (=0). The vertical axis of the position error signal variations PESL12 indicates a position error signal PES2 and a position error signal −PES2. In FIG. 8, the position error signal variations PESL12 of the head HD11 (or the head HD10) of the actuator AC1 are made in the range of the position error signals PES2 to −PES2. The absolute value of the position error signal PES2 and the absolute value of the position error signal −PES2 may be the same or different from each other. The absolute value of the position error signal PES2 is smaller than the absolute value of the position error signal PES1. The absolute value of the position error signal −PES2 is smaller than the absolute value of the position error signal −PES1.

In the example shown in FIG. 8, the system controller 130 applies a seek current to the actuator AC0 to seek the head HD00 (or the HD01) and cause the head HD11 (or the HD10) of the actuator AC1 to access a particular area of the disk DK1. The position error signal variations PESL12 in a particular area accessed by the head HD11 (or the head HD10) of the actuator AC1 are made according to the seek current variations SCL02 corresponding to the head HD00 (or the head HD01) of the actuator AC0. That is, when a seek current is applied to the actuator AC0 to seek the head HD00 for the HD01), a position error signal in a particular area accessed by the head HD11 (or the head HD10) of the actuator AC1 is influenced. As is seen from FIGS. 6 and 7, if a seek current to be applied to the actuator AC0 is decreased, an influence on the position error signal in a particular area accessed by the head HD11 (or the head HD10) of the actuator AC1 can be lessened. Even though a seek current is applied to the actuator AC1 to seek the head HD11 (or the HD10) and to access a particular area of the disk DK0 by the head HD00 (or the head HD01) of the actuator AC0, an influence similar to that when a seek current is applied to the actuator AC0 to seek the head HD00 for the HD01) and to access a particular area of the disk DK1 by the head HD11 (or the head HD10) of the actuator AC1, may be caused.

Figure 9:
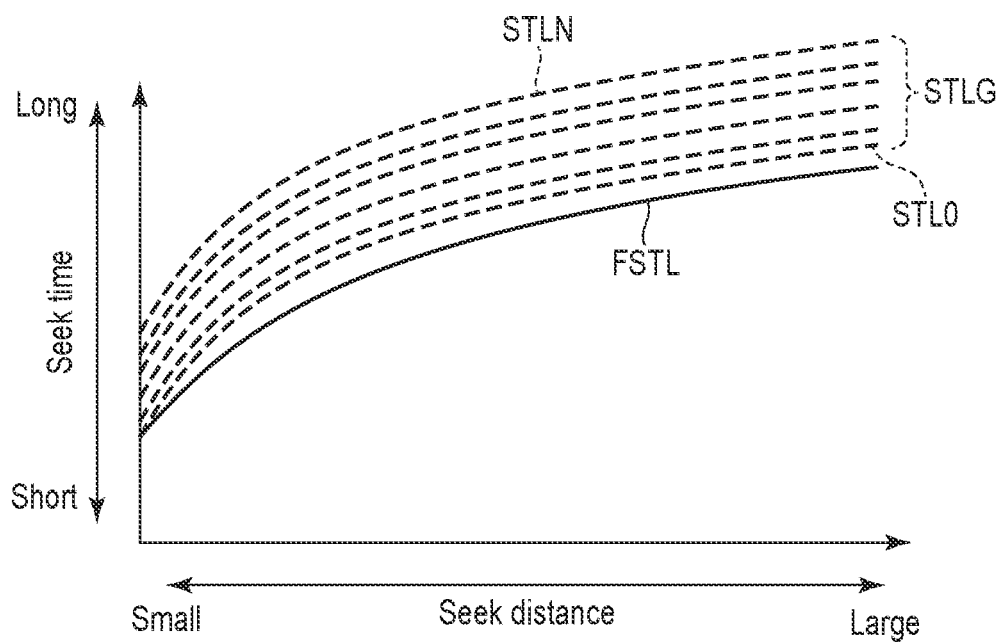
FIG. 9 is a schematic diagram showing an example of a reordering table according to the embodiment.

FIG. 9 is a schematic diagram showing an example of a reordering table according to the present embodiment. FIG. 9 shows variations STLG in seek time with a plurality of seek distances capable of seeking with a seek current that has no influence upon a plurality of heads HD corresponding to their respective head numbers (which may also be referred to as a seek time variation group hereinafter), and variations FSTL in seek time with a seek distance at the time of the earliest seek (referred to earliest seek time variations hereinafter). The seek time variation group STLG includes variations STL0 in seek time with a seek distance capable of seeking with a seek current that has no influence upon the head ID of head number 0, for example, the head HD00 or HD10 (which may also be referred to as a seek time variation hereinafter) and variations STLN in seek time capable of seeking with a seek current that has no influence upon the head HD of head number N, for example, the head HD01 or HD11. The horizontal axis of the seek time variation (or the reordering table) indicates a seek distance, and the vertical axis thereof indicates seek time. In the horizontal axis, the seek distance increases toward the "large" direction of the double-headed arrow and decreases the "small" direction thereof. In the vertical axis, the seek time increases toward the "long" direction of the double-headed arrow and decreases the "short" direction thereof.

In the example shown in FIG. 9, the system controller 130 may add information on mutual interference of the own and other actuators AC to the reordering table shown in FIG. 9 to perform a reordering process according to the level of allowable mutual interference of the own and other actuators AC. Based on the current and future operating states of the own and other actuators AC, the current position of the head HD corresponding to the own actuator AC, a plurality of queue commands stored in the queue for each interface IF (or actuator AC) in the order received from the host 100 or the like, and the reordering table shown in FIG. 9, the system controller 130 may calculate a plurality of times for gaining access to each of the positions of a plurality of sectors (data sectors) of the disk DK designated by the queue commands from the current position.

Figure 10:
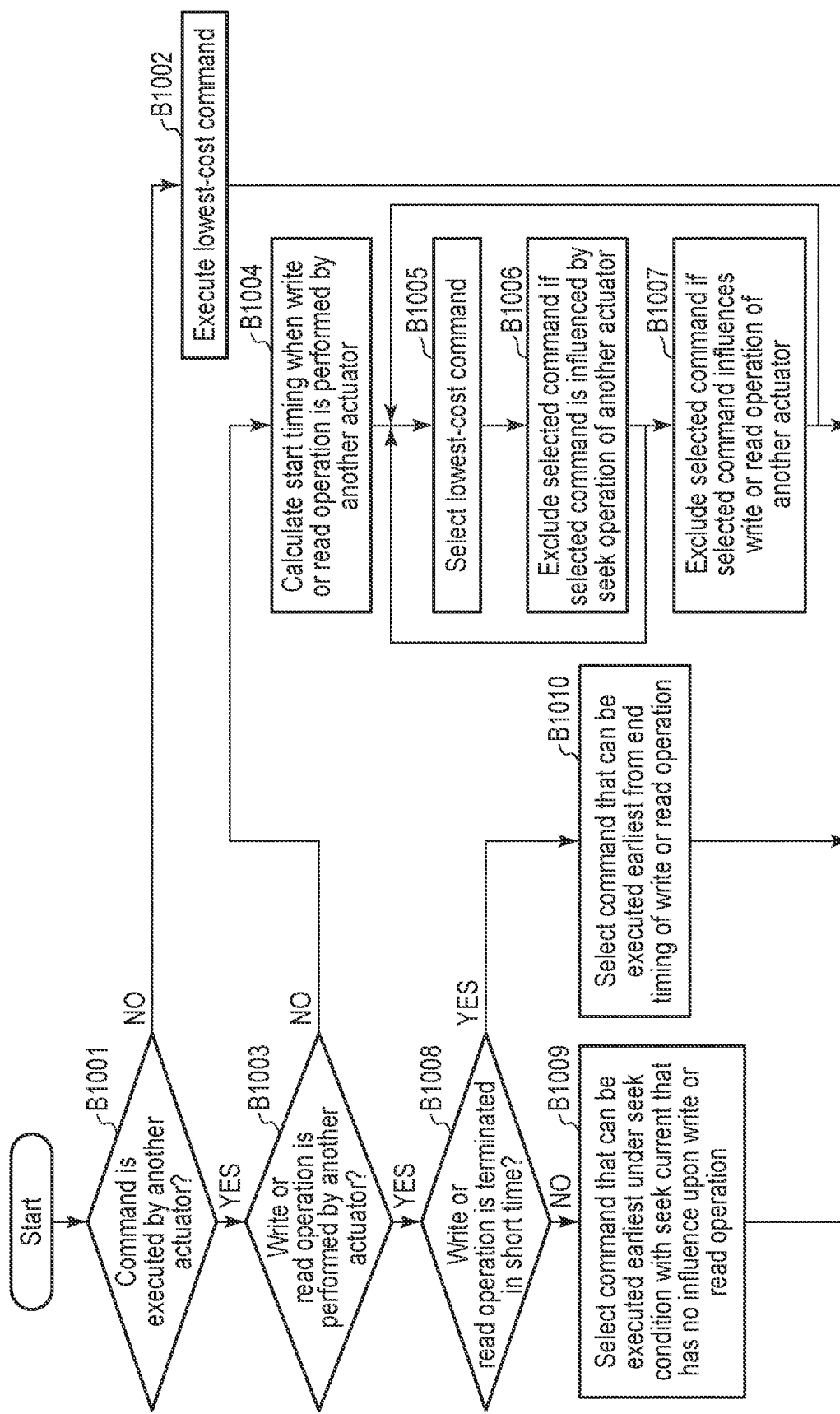
FIG. 10 is a flowchart showing an example of the reordering process according to the embodiment.

FIG. 10 is a flowchart showing an example of the reordering process according to the present embodiment.

The system controller 130 determines whether the other actuator AC is executing a command (B1001). When the system controller 130 determines that the other actuator AC is not executing a command (NO in B1001), it executes a lowest-cost command from a plurality of queue commands of the own actuator AC (B1002) and terminates the process. For example, the system controller 130 executes a command that can be executed earliest by the own actuator AC and terminates the process.

It the system controller 130 determines that the other actuator AC is executing a command (YES in B1001), it determines whether the other actuator AC is performing a write or read operation (B1003). When the system controller 130 determines that the other actuator AC is not performing a write or read operation (NO in B1003), it calculates start timing (scheduled time) when the other actuator starts to perform a write or read operation (B1004), and selects, as a next-processed command, a lowest-cost command that can be executed earliest, from the queue commands of the own actuator AC based on the start timing when the other actuator starts to perform the write or read operation (B1005). When a command selected from the queue commands of the own actuator AC is influenced by the seek operation of the other actuator AC, the system controller 130 excludes the selected command and proceeds to step B1005.

When the command selected from the queue commands of the own actuator AC is not affected by the seek operation of the other actuator AC, the system controller 130 proceeds to step B1007 (B1006). When a command selected from the queue commands of the own actuator AC influences the write or read operation of the other actuator AC, the system controller 130 excludes the selected command and proceeds to step B1005. When the command selected from the queue commands of the own actuator AC has no influence upon the write or read operation of the other actuator AC (B1007), the system controller 130 executes the selected command and terminates the process.

If the system controller 130 determines that the other actuator AC is performing a write or read operation (YES in B1003), it determines whether the write or read operation is terminated in a short time or not (B1008). When the system controller 130 determines that the write or read operation or the other actuator AC is not terminated in a short time, that is, it takes a long time to terminate the operation (No in B1008), it selects, as a next-processed command, a lowest-cost command that can be executed earliest under a seek condition with a seek current that does has no influence upon the write or read operation of the other actuator, from the queue commands of the own actuator AC (B1009), executes the selected command, and terminates the process. When the system controller 130 determines that the write or read operation of the other actuator AC is terminated in a short time (Yes in B1008), it selects, as a next-processed command, a lowest-cost command, which can be executed earliest from the end timing (scheduled end time) of the write or read operation of the other actuator AC, from the queue commands of the own actuator AC (B1010), executes the selected command, and terminates the process.

According to the present embodiment, the magnetic disk device 1 includes a plurality of actuators AC. The magnetic disk device 1 calculates each of a plurality of access costs of a plurality of queue commands of an own actuator AC stored in a queue for each interface IF (or actuator AC) based on reordering information. Based on the reordering information and the result of calculation of the access costs, the magnetic disk device 1 selects, as a next-processed command, a lowest-cost command capable of minimizing performance degradation due to mutual interference of the own actuator AC and other actuator, from the queue commands of the own actuator AC, and changes the order of the lowest-cost command selected in the queue commands of the own actuator AC to the next order. The magnetic disk device 1 can thus improve in its access performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first disk;
a second disk;
a first head which writes data to the first disk and reads data from the first disk;
a second head which writes data to the second disk and reads data from the second disk;

a first actuator including the first head;
a second actuator including the second head; and
a controller which performs a first reordering process for a command stored in a first queue corresponding to the first actuator and performs a second reordering process for a command stored in a second queue corresponding to the second actuator,
wherein the controller selects a first command to be executed next by the first actuator based on current and future operating states of the second actuator, and executes the first command.

2. The magnetic disk device of claim 1, wherein the controller selects a first command that can be executed earliest based on an operating state of one of write and read operations of the second actuator.

3. The magnetic disk device of claim 2, wherein when the controller determines that one of the write and read operations of the second actuator is terminated in a short time, the controller selects a first command that can be executed earliest from timing when one of the write and read operations of the second actuator is terminated.

4. The magnetic disk device of claim 2, wherein when the controller determines that a long time is required to terminate one of the write and read operations of the second actuator, the controller selects a first command that can be executed earliest under a seek condition with a seek current that has no influence upon one of the write and read operations of the second actuator.

5. The magnetic disk device of claim 2, wherein when the controller determines that one of the write and read operations of the second actuator is not performed, the controller selects a first command that can be executed earliest from timing when one of the write and read operations of the first actuator is started.

6. The magnetic disk drive of claim 5, wherein the controller excludes the first command from selection if the first command is influenced by a seek operation of another actuator.

7. The magnetic disk drive of claim 6, wherein the controller excludes the first command from selection if the first command influences one of the write and read operations of another actuator.

8. The magnetic disk device of claim 1, wherein the controller selects a first command corresponding to an allowable level of mutual interference of the first actuator and the second actuator, based on a table showing a relationship between seek time and a seek distance of a head including information of the mutual interference.

9. The magnetic disk device of claim 1, wherein the controller compares the first command, which causes the first head to gain access to a first target position of the first disk in a first time, with a second command which causes the second head to gain access to a second target position of the second disk in a second time, selects the first command to cause the first head to gain access to the first position in the first time that is shorter than the second time, and executes the first command.

10. The magnetic disk device of claim 1, wherein the operating states include a command executing state, a read/write operation performing state, seek states of the first head and the second head, positions of the first head and the second head, velocities of the first head and the second head, accelerations of the first head and the second head, timing when a write/read operation is started by the first head and the second head, and timing when the write/read operation is terminated by the first head and the second head.

11. A reordering method applied to a magnetic disk device which includes a first disk, a second disk, a first head which writes data to the first disk and reads data from the first disk, a second head which writes data to the second disk and reads data from the second disk, a first actuator including the first head, a second actuator including the second head, and a controller which performs a first reordering process for a command stored in a first queue corresponding to the first actuator and performs a second reordering process for a command stored in a second queue corresponding to the second actuator, the method comprising:
selecting a first command to be executed next by the first actuator based on current and future operating states of the second actuator; and
executing the first command.

12. The reordering method of claim 11, further comprising:
selecting a first command that can be executed earliest based on an operating state of one of write and read operations of the second actuator.

13. The reordering method of claim 12, further comprising:
when the controller determines that one of the write and read operations of the second actuator is terminated in a short time, selecting a first command that can be executed earliest from timing when one of the write and read operations of the second actuator is terminated.

14. The reordering method of claim 12, further comprising:
when the controller determines that a long time is required to terminate one of the write and read operations of the second actuator, selecting a first command that can be executed earliest under a seek condition with a seek current that has no influence upon one of the write and read operations of the second actuator.

15. The reordering method of claim 12, further comprising:
when the controller determines that one of the write and read operations of the second actuator is not performed, selecting a first command that can be executed earliest from timing when one of the write and read operations of the first actuator is started.

16. The reordering method of claim 15, further comprising:
excluding the first command from selection if the first command is influenced by a seek operation of another actuator.

17. The reordering method of claim 16, further comprising:
excluding the first command from selection if the first command influences one of the write and read operations of another actuator.

18. The reordering method of claim 11, further comprising:
selecting a first command corresponding to an allowable level of mutual interference of the first actuator and the second actuator, based on a table showing a relationship between seek time and a seek distance of a head including information of the mutual interference.

19. The reordering method of claim 11, further comprising:
comparing the first command, which causes the first head to gain access to a first target position of the first disk in a first time, with a second command which causes the second head to gain access to a second target position of the second disk in a second time, selecting the first command to cause the first head to gain access to the first position in the first time that is shorter than the second time; and executing the first command.

20. The reordering method of claim 11, wherein the operating states include a command executing state, a read/write operation performing state, seek states of the first head and the second head, positions of the first head and the second head, velocities of the first head and the second head, accelerations of the first head and the second head, timing when a write/read operation is started by the first head and the second head, and timing when the write/read operation is terminated by the first head and the second head.

* * * * *